United States Patent [19]
Sudduth et al.

[11] Patent Number: 6,066,303
[45] Date of Patent: *May 23, 2000

[54] APPARATUS AND METHOD FOR REDUCING NOX FROM EXHAUST GASES PRODUCED BY INDUSTRIAL PROCESSES

[75] Inventors: Bruce C. Sudduth, Corona, Calif.; Ralph J. Slone, Columbus, Ind.; Vishwesh Palekar, Norwalk; Madhu Ramavajjala, Tustin, both of Calif.

[73] Assignee: Noxtech, Inc., Irvine, Calif.

[*] Notice: This patent is subject to a terminal disclaimer.

[21] Appl. No.: 09/211,879

[22] Filed: Dec. 14, 1998

Related U.S. Application Data

[63] Continuation of application No. 08/742,769, Nov. 1, 1996, Pat. No. 5,985,222.

[51] Int. Cl.$^7$ .................................................. B01D 53/56
[52] U.S. Cl. ...................... 423/235; 423/237; 423/239.1; 423/245.3; 423/246; 423/DIG. 5
[58] Field of Search .................... 423/235, 237, 423/239.1, 245.3, 246, DIG. 5

[56] References Cited

U.S. PATENT DOCUMENTS

| | | | |
|---|---|---|---|
| 3,867,507 | 2/1975 | Myerson | 423/212 |
| 3,873,671 | 3/1975 | Reed et al. | 423/235 |
| 3,900,554 | 8/1975 | Lyon | 423/235 |
| 4,115,515 | 9/1978 | Tenner et al. | 423/235 |
| 4,208,386 | 6/1980 | Arand et al. | 423/235 |
| 4,302,431 | 11/1981 | Aluskawa et al. | 423/239 |
| 4,602,673 | 7/1986 | Michelfelder et al. | 165/7 |
| 4,678,643 | 7/1987 | Fetzer et al. | 422/175 |
| 4,719,092 | 1/1988 | Bowers | 423/235 |
| 4,719,094 | 1/1988 | Riekert et al. | 423/239 |
| 4,731,231 | 3/1988 | Perry | 423/235 |
| 4,751,065 | 6/1988 | Bower | 423/235 |
| 4,770,863 | 9/1988 | Epperly et al. | 423/235 |
| 4,777,024 | 10/1988 | Epperly et al. | 423/235 |
| 4,780,289 | 10/1988 | Epperly et al. | 423/235 |
| 4,800,068 | 1/1989 | Perry | 422/173 |
| 4,803,059 | 2/1989 | Sullivan et al. | 423/235 |
| 4,830,839 | 5/1989 | Epperly et al. | 423/235 |
| 4,844,878 | 7/1989 | Epperly et al. | 423/235 |

(List continued on next page.)

FOREIGN PATENT DOCUMENTS

| | | |
|---|---|---|
| 578863 | 1/1997 | European Pat. Off. . |
| 53-132466 | 11/1978 | Japan . |
| 54-5863 | 1/1979 | Japan . |
| 63-54619A | 3/1988 | Japan . |
| 2258018A | 10/1990 | Japan . |
| 2268811A | 11/1993 | Japan . |
| WO 89 08606 | 9/1989 | WIPO . |
| WO 93 03998 | 3/1993 | WIPO . |

OTHER PUBLICATIONS

Mizuno, et al.; "Application of a Corona Technology in the Reduction of Greenhouse Gases and Other Gaseous Pollutants"; Non–Thermal Plasma Techniques for Pollution Control–Part B: Electron Beam and Electrical Discharge; Springer–Verlag, Heidelberg 1993 pp. 165–185.

(List continued on next page.)

*Primary Examiner*—Steven P. Griffin
*Assistant Examiner*—Timothy C. Vanoy
*Attorney, Agent, or Firm*—Loudermilk & Associates

[57] ABSTRACT

Gas-phase methods and systems for reducing NOx emissions and other contaminants in exhaust gases, and industrial processes using the same, are disclosed. In accordance with the present invention, hydrocarbon(s) autoignite and autothermally heat an exhaust gas from an industrial process so that $NH_3$, HNCO or a combination thereof are effective for selectively reducing NOx autocatalytically. Preferably, the reduction of NOx is initiated/driven by the autoignition of hydrocarbon(s) in the exhaust gas. Within the temperature range of about 900–1600° F., the introduced hydrocarbon(s) autoignite spontaneously under fuel-lean conditions of about 2–18% $O_2$ in the exhaust gas. Once ignited, the reactions proceed autocatalytically, heating the exhaust gas autothermally. Under some conditions, a blue chemiluminescence may be visible.

45 Claims, 9 Drawing Sheets

U.S. PATENT DOCUMENTS

| | | | |
|---|---|---|---|
| 4,851,201 | 7/1989 | Heap et al. | 423/235 |
| 4,861,567 | 8/1989 | Heap et al. | 423/235 |
| 4,863,704 | 9/1989 | Epperly et al. | 423/235 |
| 4,863,705 | 9/1989 | Epperly et al. | 423/235 |
| 4,867,953 | 9/1989 | Riekert et al. | 423/239 |
| 4,873,066 | 10/1989 | Epperly et al. | 423/235 |
| 4,877,590 | 10/1989 | Epperly et al. | 423/235 |
| 4,877,591 | 10/1989 | Epperly et al. | 423/235 |
| 4,886,650 | 12/1989 | Perry | 423/235 |
| 4,888,165 | 12/1989 | Epperly et al. | 423/235 |
| 4,902,488 | 2/1990 | Epperly et al. | 423/235 |
| 4,908,193 | 3/1990 | Perry | 423/235 |
| 4,927,612 | 5/1990 | Bowers | 423/235 |
| 4,978,514 | 12/1990 | Hofmann et al. | 423/235 |
| 4,985,218 | 1/1991 | Devita | 423/235 |
| 4,997,631 | 3/1991 | Hofmann et al. | 423/235 |
| 5,017,347 | 5/1991 | Epperly et al. | 423/235 |
| 5,047,219 | 9/1991 | Epperly et al. | 423/235 |
| 5,048,432 | 9/1991 | Hofmann et al. | 110/345 |
| 5,057,293 | 10/1991 | Epperly et al. | 423/235 |
| 5,078,064 | 1/1992 | Breen et al. | 110/212 |
| 5,139,754 | 8/1992 | Luftglass et al. | 423/235 |
| 5,139,755 | 8/1992 | Seeker et al. | 423/235 |
| 5,147,516 | 9/1992 | Mathur et al. | 204/177 |
| 5,240,575 | 8/1993 | Mathua et al. | 204/177 |
| 5,286,467 | 2/1994 | Sun et al. | 423/239.1 |
| 5,440,876 | 8/1995 | Bayliss et al. | 60/274 |
| 5,458,748 | 10/1995 | Breault et al. | 204/177 |
| 5,510,092 | 4/1996 | Mansour et al. | 423/239.1 |
| 5,609,736 | 3/1997 | Yamamoto | 204/164 |
| 5,746,984 | 5/1998 | Hoard | 204/164 |
| 5,899,269 | 5/1999 | Wellington et al. | 166/58 |
| 5,985,222 | 11/1999 | Sudduth et al. | 423/235 |

OTHER PUBLICATIONS

Gentile, et al.; "Microstreamer Initiated Advection in Dielectric Barrier Discharges for Plasma Remediation of NxOy: Single and Multiple Streamers"; Proceedings of the 1995 Diesel Engine Emissions Reduction Workshop, Univ. of California, San Diego Jul. 24–27; pp. V45–V56.

Chess, et al.; "Plasma Versus Thermal Effects in Flue Gas NOx Reduction Using Ammonia Radical Injection"; Journal of Air & Waste Management Association, Aug. 1995, vol. 45, pp. 627–632.

Vogtlin, et al.; "Pulsed Corona Discharge for Removal of NOx from Flue Gas"; Non–Thermal Plasma Techniques for Pollution Control–Part B: Electron Beam and Electrical Discharge; Springer–Verlag, Heidelberg 1993 pp. 187–197.

Fujii, et al.; "Simultaneous Removal of NOx, COx, SOx and Soot in Diesel Engine Exhaust"; Non–Thermal Plasma Techniques for Pollution Control–Part B: Electron Beam and Electrical Discharge; Springer–Verlag, Heidelberg 1993 pp. 257–279.

Wallman, et al.; "Nonthermal Aftertreatment of Diesel Engine Exhaust"; Proceedings of the 1995 Diesel Engine Emissions Reduction Workshop, Univ. of California, San Diego Jul. 24–27, pp. V33–V39.

Penetrante, et al.; "NOx Reduction by Compact Electron Beam Processing"; Proceedings of the 1995 Diesel Engine Emissions Reduction Workshop, Univ. of California, San Diego Jul. 24–27; pp. IV75–IV85.

Fanick, et al.; "Reduction of Diesel NOx/Particulate Emissions Using a Non–Thermal Plasma"; Proceedings of the 1995 Diesel Engine Emissions Reduction Workshop, Univ. of California, San Diego Jul. 24–27; pp. V57–V67.

Lyon "Controlling Nitrogen Oxides Emissions by a Non-catalytic Process"; Combust. Sci. and Tech., vol. 25, No. 3, 1987, pp. 231–236.

Lyon and Hardy "Discovery and Development of Thermal DeNOx Process";Ind. Eng. Chem. Fundam. vol. 25, No. 1,m 1986, pp. 19–24.

Caton and Siebers "Comparison of Nitric Oxide Removal by Cyanuric Acid and by Ammonia"; Combust. Sci. and Tech, vol. 65, 1989, pp. 277–293.

Dean, Hardy and Lyon "Kinetics and Mechanism of NH3 Oxidation"; Nineteenth Symposium on Combustion/The Combustion Institute, 1982, pp. 97–105.

Hurst "Improved Thermal DeNOx Process Verified by Field Testing"; Exxon Technology, Presented at Air Pollution Control Assn., Annual Meeting in San Francisco, California on Jun. 27, 1984, pp. 1–13.

Olsen J.C. "Unit Processes and Principles of Chemical Engineering" D. Van Nostrand Co., New York, pp. 1–3, Jul. 1932.

Perry et al. "Chemical Engineers' Handbook," $5^{th}$ Edition, 1973, McGraw–Hill Book Co., U.S.A. pp. 22–4 to 22–7, 22–136 to22–144. ISBN 0–07–049478–9.

Levenspiel O. "Chemical Reaction Engineering,"$2^{nd}$ Edition, 1972, John Wiley & Sons, New York, pp. 56–60, 149–157, 226–231, 1972. ISBN 0–471–53016–6.

$X_A$ = Conversion
T = Temperature $X_A$ = Conversion
T = Temperature $X_A$ = Conversion
T = Temperature Exhaust Gas
Containing NOx and O$_2$ Hydrocarbon(s) →

Reductant(s) →

Autoignition and
Autothermal Heating

Generating NH$_3$, HNCO,
or Combination Thereof

NOx and CO Removal
Depletion of NH$_3$

Treated Exhaust Gas
with Low NOx Level

| Key | |
|---|---|
| Heat or Work | ↓ |
| Exhaust Gas | ↓ |
| Gas Mixing | ↝ |
| Gas Mixing | ↝ |

APPARATUS AND METHOD FOR REDUCING NOX FROM EXHAUST GASES PRODUCED BY INDUSTRIAL PROCESSES

This application is a continuation of application Ser. No. 08/742,769, filed on Nov. 1, 1996 now U.S. Pat. No. 5,985,222.

FIELD OF THE INVENTION

The present invention relates to the removal of nitrogen oxides or "NOx" from exhaust gases and the like, and more particularly to processes and apparatus for reducing NOx selectively using autocatalytic, autothermal reactions in a manner to also remove other exhaust contaminants from the combustion of carbonaceous fuels, and also to industrial processes using the same.

BACKGROUND OF THE INVENTION

Without being bound by any particular theory, the background of the present invention will be described by way of a description of particular problems discussed in the art and various proposed solutions to such problems. For brevity, various references will be briefly and generally summarized herein. A more complete understanding of such background art may be obtained by a complete review of the documents cited herein, etc. What should be understood from the following discussion is that, despite such extensive prior efforts to provide various methods of NOx removal and the like, a continuing need exists for practical and low-cost methods of NOx removal in a variety of industrial processes, which may utilize a variety of commercially-available reductants.

Carbonaceous fuels are burned in internal combustion engines and other equipment such as boilers, furnaces, heaters and incinerators, and the like (i.e., in a wide variety of industrial process). Excess air frequently is used to complete the oxidation of combustion byproducts such as carbon monoxide (CO), hydrocarbons and soot. High temperature combustion using excess air, however, tends to generate oxides of nitrogen (often referred to as NOx).

Emissions of NOx include nitric oxide (NO) and nitrogen dioxide ($NO_2$). Free radicals of nitrogen ($N_2$) and oxygen ($O_2$) combine chemically primarily to form NO at high combustion temperatures. This thermal NOx tends to form even when nitrogen is removed from the fuel. Combustion modifications which decrease the formation of thermal NOx generally are limited by the generation of objectionable byproducts.

Mobile and stationary combustion equipment are concentrated sources of NOx emissions. When discharged to the air, emissions of NO oxidize to form $NO_2$, which tends to accumulate excessively in many urban atmospheres. In sunlight, the $NO_2$ reacts with volatile organic compounds to form groundlevel ozone, eye irritants and photochemical smog. These adverse effects have prompted extensive efforts for controlling NOx emissions to low levels. Despite advancements in fuel and combustion technology, ground-level ozone concentrations still exceed federal guidelines in many urban regions. Under the Clean Air Act and its amendments, these ozone nonattainment areas must implement stringent NOx emissions regulations. Such regulations will require low NOx emissions levels that are attained only by exhaust aftertreatment.

Exhaust aftertreatment techniques tend to reduce NOx using various chemical or catalytic methods. Such methods are known in the art and involve nonselective catalytic reduction (NSCR), selective catalytic reduction (SCR) or selective noncatalytic reduction (SNCR). Alternatively, NO may be oxidized to $NO_2$ for removal by wet scrubbers. Such aftertreatment methods typically require some type of reactant for removal of NOx emissions.

Wet scrubbing of $NO_2$ produces waste solutions that represent potential sources of water pollution. Wet scrubbers primarily are used for NOx emissions from nitric acid plants or for concurrent removal of $NO_2$ with sulfur dioxide ($SO_2$). High costs and complexity generally limit scrubber technology to such special applications. Wet scrubbers are applied to combustion exhaust by converting NO to $NO_2$, such as is described in U.S. Pat. No. 5,047,219.

The NSCR method typically uses unburned hydrocarbons and CO to reduce NOx emissions in the absence of $O_2$. Fuel/air ratios must be controlled carefully to ensure low excess $O_2$. Both reduction and oxidation catalysts are needed to remove emissions of CO and hydrocarbons while also reducing NOx. The cost of removing excess $O_2$ precludes practical applications of NSCR methods to many $O_2$-containing exhaust gases.

Combustion exhaust containing excess $O_2$ generally requires chemical reductant(s) for NOx removal. Commercial SCR systems primarily use ammonia ($NH_3$) as the reductant. Chemical reactions on a solid catalyst surface convert NOx to $N_2$. These solid catalysts are selective for NOx removal and do not reduce emissions of CO and unburned hydrocarbons. Excess $NH_3$ needed to achieve low NOx levels tends to result in $NH_3$ breakthrough as a byproduct emission.

Large catalyst volumes are normally needed to maintain low levels of NOx and $NH_3$ breakthrough. The catalyst activity depends on temperature and declines with use. Normal variations in catalyst activity are accommodated only by enlarging the volume of catalyst or limiting the range of combustion operation. Catalysts may require replacement prematurely due to sintering or poisoning when exposed to high levels of temperature or exhaust contaminants. Even under normal operating conditions, the SCR method requires a uniform distribution of $NH_3$ relative to NOx in the exhaust gas. NOx emissions, however, are frequently distributed nonuniformly, so low levels of both NOx and $NH_3$ breakthrough may be achieved only by controlling the distribution of injected $NH_3$ or mixing the exhaust to a uniform NOx level.

$NH_3$ breakthrough is alternatively limited by decomposing excess $NH_3$ on the surface of a catalyst as described in U.S. Pat. No. 4,302,431. In this case, the excess $NH_3$ is decomposed catalytically following an initially equivalent decomposition of NOx and $NH_3$ together. The decomposition of excess $NH_3$, however, reduces the selectivity of the SCR method, increasing the molar ratio of $NH_3$ with respect to NOx as much as 1.5 or higher.

In a combination of catalytic and noncatalytic reduction methods, both NOx and $NH_3$ removal may be controlled by SCR following an initial stage of NOx reduction by SNCR. In the SNCR method, NOx emissions may be reduced partially without controlling $NH_3$ breakthrough to a low level. The SCR method may decrease NOx further while also lowering $NH_3$ breakthrough to an acceptable level.

The use of excess $NH_3$ to enhance NOx removal by the SNCR method is described in detail in U.S. Pat. Nos. 4,978,514 and 5,139,754. With such methods, the $NH_3$ injection to SNCR is controlled so that the unreacted $NH_3$ remains sufficient for the subsequent catalytic reduction of NOx to a low level. This injection strategy is based on the use of excess $NH_3$ for reducing NOx to lower levels, as with the SCR method described above.

Another method for combining SNCR and SCR methods is described in U.S. Pat. No. 5,510,092. In this method, the catalytic NOx reduction is always maximized using a separate $NH_3$ injection grid, and the NOx emissions are reduced noncatalytically only as needed to maintain a final low NOx level. This method decreases the consumption of $NH_3$ by minimizing the use of SNCR which removes NOx less selectively than the catalytic method.

The low selectivity of the SNCR method and the use of excess $NH_3$ for decreasing NOx levels is reported by Lyon, who is believed to have first suggested the noncatalylic reduction of NOx (U.S. Pat. No. 3,900,554). In commercial coal-fired boiler tests, 73% NO reduction has been reported with 2.2 ppm $NH_3$ breakthrough using a 0.9 molar ratio of $NH_3$ with respect to NO, while 86% NO reduction required 11 ppm $NH_3$ breakthrough and a 2.2 molar ratio of $NH_3$ with respect to NOx. These results are reported in Environ. Sci. Technol., Vol. 21, No. 3, pages 231–236 1987.

In another article (Ind. Eng. Chem. Fundam., Vol. 25, No. 1, pages 19–24 1986), Lyon also reports the inhibiting effect of $NH_3$ on CO oxidation. This observation in experiments and commercial tests is confirmed by modeling studies. The inhibition has been explained in terms of competition between $NH_3$ and CO for reaction with the OH free radical. It is believed that, while $NH_3$ inhibits the oxidation of CO, the CO also decreases the selectivity of NO reduction by $NH_3$.

This "sacrifice of residual CO oxidation" is described by Lyon as an important limitation of the noncatalytic reduction method. According to these teachings, the injection of $NH_3$ should follow the completion of CO oxidation in order to overcome this limitation. When $NH_3$ is injected before the completion of CO oxidation, the oxidation of residual CO tends to diminish, which may result in greater levels of byproduct CO emissions.

Despite this disadvantage of greater byproduct CO emissions, many patents teach the use of CO or other ancillary reducing materials to lower the effective temperature for reducing NO noncatalytically. For example, the use of CO to lower the temperature for NO reduction by HNCO is discussed in U.S. Pat. No. 4,886,650 as follows: "Where it is desired to lower the operating temperature to a greater degree, larger amounts of CO or other H atom generating species will be added or vice-versa."

This lowering of the effective temperature for NO reduction has been repeated generally in a consistent manner throughout patent literature related to the noncatalytic method. The original discoveries of $NH_3$ (U.S. Pat. No. 3,900,554) and urea (U.S. Pat. No. 4,208,386) as NOx reductants in the temperature range of 1600 to 2000° F. both reported the use of ancillary reducing materials to enable noncatalytic NO reduction throughout the temperature range of 1300 to 2000° F. Hydrogen ($H_2$), CO, and hydrocarbon(s), including oxygenated hydrocarbons, have been proposed as ancillary reducing materials that may lower the effective temperature for noncatalytic NO reduction by $NH_3$ or urea. This use of hydrocarbon(s) and CO is reportedly limited, however, due to incomplete oxidation, resulting in the production of air pollutants. Hydrogen has been cited as the preferred reducing material because it does not produce any air pollutants.

The use of hydrogen is limited because it decreases the selectivity for NO reduction by $NH_3$ or urea. To overcome this limitation, the hydrogen may be added in successive multiple stages as described in U.S. Pat. No. 3,900,554. A more detailed description of a multi-stage method for non-catalytic NO reduction using $NH_3$ and hydrogen is disclosed in U.S. Pat. No. 4,115,515. This multi-stage method typically requires two or more locations along the flowpath of the exhaust gas to inject reducing gas mixtures. The optimum use of multiple injection stages and alternative reducing gas mixtures depends on the exhaust gas temperature in the vicinity of each injection location. The multi-stage method accounts for temperature gradients along the gas flowpath as well as variations in temperature at each injection location.

Generally according to the these teachings, $NH_3$ is injected as the only reducing gas at temperatures in the range of 900 to 1000° C. (about 1650 to 1850° F.), while mixtures of $NH_3$ and hydrogen are injected at temperatures in the range of 700 to 900° C. (about 1300 to 1650° F.). Decreasing the NO concentration in the first injection stage using $NH_3$ alone minimizes the less-selective reduction of NO in the second stage where hydrogen is used as the ancillary reducing material.

Patents have proliferated since such disclosures of non-catalytic reduction methods. In particular, U.S. Pat. Nos. 4,731,231, 4,800,068, 4,886,650 and 4,908,193 have disclosed the decomposition of cyanuric acid, $(HNCO)_3$, to generate isocyanic acid (HNCO) for NO reduction. Also, other patents (for example, U.S. Pat. Nos. 4,719,092, 4,751,065, 4,770,863, 4,803,059, 4,844,878, 4,863,705, 4,873,066, 4,877,591, 4,888,165, 4,927,612 and 4,997,631) have disclosed a variety of reducing materials as alternatives to $NH_3$, urea or cyanuric acid, or as enhancers for use with $NH_3$, urea or cyanuric acid.

Such patents primarily address the acute problems of $NH_3$ breakthrough and byproduct CO emissions that are characteristic of the noncatalytic reduction method. In addition to the disclosures of various reductants and enhancers, other patents (for example, U.S. Pat. Nos. 4,777,024, 4,780,289, 4,863,704, 4,877,590, 4,902,488, 4,985,218, 5,017,347 and 5,057,293) describe elaborate control strategies and multi-stage injection methods.

Such control strategies and multi-stage methods primarily address variations in temperature. Combustion equipment typically operate throughout a load range, and exhaust gas temperatures generally increase at higher loads. Therefore, local temperatures vary at the fixed locations where the reductant(s) and reducing material(s) are injected into the exhaust gas. The noncatalytic methods do not control the local temperature for NOx reduction.

With noncatalytic reduction methods, the local temperature typically is used as a means for controlling the injection of reductant(s) and ancillary reducing material(s). The patents teach the use of ancillary reducing material(s) to lower the effective temperature for NOx reduction so that it matches the actual local temperature, which depends solely on the production of the exhaust gas. It is important to note that, in such teachings, the ancillary reducing material(s) are not injected to control the local temperature. Ancillary reducing material(s) mall enable NOx reduction at lower effective temperatures, but may result in the formation of objectionable byproducts. Such teachings tend only to minimize disadvantages of noncatalytic reduction methods. Such techniques in general do not provide for concurrent depletion of $NH_3$ and CO emissions.

The use of oxygenated hydrocarbons is described in U.S. Pat. No. 4,830,839 as a means for scrubbing $NH_3$ breakthrough from a previous stage of noncatalytic NOx reduction. With this method, vaporized concentrations of oxygenated hydrocarbons in the range of 2 to 500 ppm are added to the exhaust gas so that their weight ratios with respect to $NH_3$ are in the range of 2 to 200. U.S. Pat. No. 5,047,219, however, subsequently discloses that oxygenated hydrocarbons oxidize NO to $NO_2$ at temperatures below about 1600° F.

Lowering the effective temperature for noncatalytic reduction below about 1700° F. also slows the thermal decomposition of nitrous oxide ($N_2O$) as described in U.S. Pat. No. 5,048,432. This patent teaches reheating of exhaust gases using a burner with a separate source of combustion air. The $N_2O$ is decomposed thermally when the high temperature flue gases from the burner mix and reheat the primary exhaust gas above 1700° F.

Formation of $N_2O$ as a noncatalytic reduction byproduct is described in U.S. Pat. No. 4,997,631. When NOx emissions are reduced by the noncatalytic method, a portion of the reduced NOx is converted to $N_2O$. As described above, $N_2O$ levels decrease at higher temperatures, but also the reported data suggest much less $N_2O$ formation when $NH_3$ is used as the chemical reductant. Urea and cyanuric acid reportedly result in higher $N_2O$ levels.

A different method for staging noncatalytic NO reduction is described in U.S. Pat. No. 3,867,507. Hydrocarbons are disclosed to reduce NO when the molar ratio of $O_2$ with respect to carbon is less than 2.5. Such low $O_2$ levels, however, tend to result in the formation of objectionable byproducts, including $NH_3$, hydrogen cyanide (HCN), CO and unburned hydrocarbons. Such byproducts are removed by oxidation using added air at elevated temperatures, e.g., 1100° C. (about 2000° F.), in a second stage.

Similar methods for staging noncatalytic NOx reduction are disclosed in U.S. Pat. Nos. 4,851,201 and 4,861,567. With these methods, reductant(s) are mixed with the exhaust gas and decomposed under fuel-rich combustion conditions in a first stage, and then NOx is reduced in a second stage with an excess of oxygen. The temperature and oxygen concentration are adjusted between the two stages. The temperature ranges for each stage depend on whether the reductant is cyanuric acid rather than $NH_3$ or urea.

Another method for lowering the effective temperature for noncatalytic NOx reduction is described in Int. App. No. PCT/US92/07212 (Pub. No. WO 93/03998). It is suggested that hydrocarbons be injected so as to create stratified mixtures effective for generating partial oxidation products as ancillary reducing materials to lower the effective temperature for NOx reduction using cyanuric acid.

Based on such previous teachings, noncatalytic NOx reduction by hydrocarbon(s) alone tends to be limited to fuel-rich combustion conditions, i.e., low $O_2$ levels. In the presence of excess $O_2$, hydrocarbon(s) and CO are ineffective for NOx reduction, but may be used to lower the effective temperature for noncatalytic NOx reduction using chemical reductint(s). In such an ancillary role, such materials also are claimed to lower $NH_3$ breakthrough, but such would be achieved only at the expense of decreased selectivity for NOx reduction.

Under these conditions, noncatalytic NOx reduction tends to be limited because excess $NH_3$ breakthrough is needed to achieve low NOx levels, but the oxidation of CO is inhibited by $NH_3$, so the lowering of noncatalytic reduction temperature using ancillary materials tends to increase byproduct CO emissions. Both $NH_3$ and CO are objectionable SNCR byproducts. In general, even the most elaborate proposed SNCR controls and staging methods cannot deplete these objectionable byproducts concurrently. In general, such methods only minimize the disadvantageous production of one byproduct at the expense of increasing another.

Furthermore, noncatalytic reduction methods are highly dependent upon temperature, but tend to provide no means for controlling this key condition. Staging methods and elaborate controls are needed to maintain an effective temperature for the chemical reductint(s) when excess $O_2$ is present at the local exhaust gas conditions. Injecting reductant(s) under specific fuel-rich combustion conditions also is claimed to require a staged introduction of excess air to complete the combustion of primary fuel.

Despite such staging methods and elaborate controls, the $NH_3$ breakthrough from SNCR in general is depleted only by using a subsequent catalytic method. Such SCR methods, however, do not remove the objectionable byproduct CO emissions from SNCR without using a separate oxidation catalyst similar to NSCR. Alternatively, this disadvantage of SNCR may be minimized to the greatest extent by limiting noncatalytic reduction only to maintain a final low NOx level in combination with SCR as described in U.S. Pat. No. 5,510,092.

Relegating the inherent advantages of a gas-phase method for reducing NOx to a subordinate role, however, does not minimize the key disadvantages of using solid catalysts. The expensive installation of large catalyst volumes intrudes adversely upon the combustion equipment. The catalyst bed adds pressure drop, and the vaporization of $NH_3$ may derate the combustion equipment by as much as 2%.

As is well known, solid catalysts tend to gradually become plugged and poisoned under normal use and require periodic replacement. Premature replacement is needed when the catalyst is sintered or poisoned due to unusually high temperatures or contaminant levels resulting from combustion-related problems or other equipment failures. Like SNCR methods, catalytic reduction methods are highly dependent upon on temperature, but provide no means for controlling this key condition.

In considering the foregoing teachings and efforts, and in particular in view of the continuing need in numerous applications for practical, cost-effective reduction of NOx despite the extensive previous efforts, a need exists for new methods for selective NOx reduction, which may in general combine certain advantages of previously disclosed methods substantially, but without disadvantages thereof.

As will be described hereinafter, Applicants submit that they have discovered such methods.

It should be understood that the foregoing discussion of the background of the present invention, and the detailed description of the present invention to follow, is provided for understanding the context and applicability of the present invention, and is provided without being bound by any particular theory or the like. References to particular background patents or other materials are for general discussion purposes only and based on Applicants' understanding thereof, and the complete references should be consulted for the actual contents of such patents and materials.

SUMMARY OF THE INVENTION

The present invention provides new gas-phase methods for reducing NOx emissions and other contaminants in exhaust gases, and for industrial processes using the same. With methods in accordance with the present invention, hydrocarbon(s) autoignite and autothermally heat an exhaust gas so that $NH_3$, HNCO or a combination thereof are effective for selectively reducing NOx autocatalytically.

These new autocatalytic methods are distinguished by the self-sustained conversion of reactants when at least one reaction product acts as a catalyst so that the reactions proceed faster with formation of the catalyst and continue until reactants are depleted substantially.

With methods in accordance with preferred embodiments of the present invention, the reduction of NOx is driven by autothermally heating the exhaust gas to generate the effective catalytic species for self-sustaining the reactions until reactants are depleted substantially. Within the temperature range of about 900–1600° F., hydrocarbon(s) are introduced to autoignite under generally uniform fuel-lean conditions with about 2–18% $O_2$ in the exhaust gas. Once ignited, the reactions proceed autocatalytically, heating the exhaust gas autothermally. Under some conditions, a blue chemiluminescence may be visible.

Such single-stage, autocatalytic methods in accordance with the present invention need not depend on the order in which the reductant(s) and hydrocarbon(s) are introduced into the exhaust gas. Contrary to previous teachings, autocatalytic methods in accordance with the present invention do not require fuel-rich combustion or multiple reaction stages. The $NH_3$, HNCO or a combination thereof may be introduced or generated from reductant(s) before or during the fuel-lean autothermal conversion of hydrocarbon(s) and CO in the exhaust gas.

Autocatalytic methods in accordance with the present invention reduce NOx and deplete both CO and $NH_3$ in a substantially concurrent manner. These autocatalytic reactions are self-sustained by the autothermal heating of the exhaust gas following the substantially uniform autoignition of the hydrocarbon(s). Gas-phase methods in accordance with the present invention may be advantageously applied without a solid catalytic surface. Self-sustaining autothermal reactions in the gas phase may serve to partially remove other exhaust gas contaminants, including hydrocarbons, particulate matter and CO.

Methods in accordance with the present invention may be considered to combine advantages of known methods for reducing NOx selectively, but, unexpectedly, without the disadvantages of solid catalytic surfaces, hazardous wastes or byproduct emissions, etc. Contrary to previous teachings, autocatalytic methods in accordance with the present invention interchangeably may use reductant(s) that consist of or decompose to generate $NH_3$, HNCO or a combination thereof. In addition, hydrocarbon(s) that may be used in embodiments of the present invention may consist of the same liquid, gaseous or vaporous fuels that are combusted to produce the exhaust gas containing NOx in the industrial process.

Also contrary to previous teachings, hydrocarbons and CO do not serve to lower the effective temperature range for reducing NOx by the autocatalytic method. With autocatalytic methods in accordance with the present invention, the exhaust gas is heated autothermally by both the partial oxidation of hydrocarbon(s) to generate CO and the oxidation of CO to $CO_2$. The introduction of $NH_3$ HNCO or a combination thereof during this autothermal heating results in NOx reduction, and the hydrocarbon(s), CO and $NH_3$ are depleted together in the same temperature range of about 1400–1550° F. Within this range, the depletion of hydrocarbon(s), CO and $NH_3$ depends primarily on the final temperature for autothermal heating of the exhaust gas.

Also contrary to previous teachings, the autocatalytic method is not limited by the inhibition of CO oxidation. Autocatalytic reactions may be self-sustained while CO and $NH_3$ are depleted together when hydrocarbon(s) autoignite and heat the exhaust gas autothermally to the temperature range of about 1400–1550° F. In accordance with the present invention, $NH_3$ may be depleted below even 2 ppm concurrently with CO removal below about 50 ppm Also contrary to previous teachings, NOx emissions are reduced to low levels while the $NH_3$ is depleted substantially. In accordance with autocatalytic methods of the present invention, NOx emissions may be reduced about 80–90% to about 50–200 ppm using $NH_3$ and HNCO nearly stoichiometrically. Furthermore, in preferred embodiments NOx emissions may be reduced by as much as 99% to levels as low as about 10 ppm using no more than about twice the stoichiometric ratio of $NH_3$ and HNCO relative to NOx.

Such uniquely concurrent gas-phase removal of NOx, $NH_3$, HNCO, hydrocarbon(s) and CO in general is not highly dependent on the chemical reductant(s). Similar results have been obtained in accordance with the present invention using $NH_3$, cyanuric acid, urea or decomposition products of urea. While the conversion of NOx to $N_2O$ may depend on the chemical reductant(s), if desired byproduct $N_2O$ emissions may be reduced to low levels using $NH_3$ rather than other chemical reductant(s).

In preferred embodiments of the present invention, the introduction of hydrocarbon(s) is controlled to maintain a final reaction temperature in the range of about 1400–1550° F. The autothermal heat release increases the exhaust gas temperature adiabatically in the absence of heat losses, or alternatively heat transfer surfaces may recover heat from the exhaust gas during the autothermal heating. Such heat recovery, however, should not cool the exhaust gas so excessively as to extinguish the autothermal reactions.

An autothermal heat release equivalent to an adiabatic temperature increase in the range of about 50–500° F. is preferentially utilized in preferred embodiments to achieve a final exhaust gas temperature in the range of about 1400–1550° F.for implementing autocatalytic methods in accordance with the present invention. The amount of hydrocarbon(s) introduced depends primarily on the initial exhaust gas temperature and any recovery (recycling) of heat released by the autothermal reactions.

Autocatalytic methods in accordance with the present invention typically utilize residence times no longer than about 1.5 seconds when the initial exhaust gas temperatures are in the range of about 900–1600° F. As more fully describe elsewhere herein, CO and $NH_3$ typically are depleted faster when the autothermal heating is initiated at higher temperatures in the range of 1050–1600° F. In this case, reaction residence times in the range of about 0.02–1.0 seconds typically may be sufficient to deplete both CO and $NH_3$ substantially. In accordance with the present invention, higher initial exhaust gas temperatures in the range of about 1200–1600° F. enable substantial CO and $NH_3$ depletion within the range of about 0.02–0.5 seconds.

In accordance with the present invention, the introduction of hydrocarbon(s) decreases beneficially when the exhaust gas is preheated to the temperature ranges of about 1050–1600° F. or about 1200–1600° F. In these cases, the autothermal heat release need not exceed an amount equivalent to an adiabatic increase of about 50–350° F. or about 50–200° F., respectively, so long as the exhaust gas is heated autothermally to a final temperature in the range of about 1400–1550° F. In accordance with the present invention, in certain embodiments this preheating of the exhaust gas also may improve the selectivity of NOx reduction.

With the present invention, the initial exhaust gas temperatures do not depend on how the exhaust gas is preheated or cooled, so long as the $O_2$ concentration is maintained in the range of about 2–18% by volume. The exhaust gas may be heated or cooled initially using heat transfer surfaces, including any of various methods for preheating the exhaust gas by recovering heat after the exhaust gas is treated using autocatalytic methods as provided herein. In alternative embodiments, the exhaust gas is heated directly by the combustion of a supplemental fuel in the exhaust gas.

In such alternative embodiments, the combustion of a supplemental fuel using excess air also may enrich the $O_2$ concentration in an otherwise $O_2$-deficient exhaust gas. In this case, the supplemental fuel combustion may serve the dual purpose of preheating the exhaust gas and enriching its $O_2$ concentration. The combustion of a supplemental fuel also may serve to preheat a portion of the exhaust gas to ignite more supplemental fuel which is combusted directly in the exhaust gas. If the exhaust gas is preheated using fuel-rich combustion, autocatalytic methods in accordance with the present invention may serve to remove in part or substantial whole the additional contaminants from the fuel-rich combustion. In this context, it is important to note that the "supplemental fuel" is combusted for the purpose of preheating the exhaust gas, and not for chemically enhancing the NOx reduction.

Autocatalytic methods in accordance with the present invention may be used in combination with various modifications to the combustion process which generates the exhaust gas. In certain embodiments, such modifications may advantageously lower NOx emissions to decrease the introduction of reductant(s) in accordance with the autocatalytic methods of the present invention. In certain embodiments, combustion modifications may beneficially maintain exhaust gas temperatures within the range of about 900–1600° F., or preferably about 1200–1600° F. for implementing autocatalytic methods of the present invention. In certain embodiments, combustion modifications may maintain the $O_2$ concentration above about 2% by volume for implementing autocatalytic methods of the present invention.

Autocatalytic methods in accordance with the present invention also maybe implemented in conjunction with the primary combustion process so that the autothermal heat release is recovered beneficially. In alternative embodiments, for example, existing or news surfaces in a heat exchange boiler may serve to recover the autothermal heat release generated in accordance with autocatalytic methods as provided herein. In such embodiments, the autothermal heating may replace primary fuel for the purpose of generating steam or cracking petrochemicals (as exemplary industrial applications), or the autothermal heating may serve to increase the generating capacity of an existing boiler, etc.

In accordance with still other embodiments, combustion modifications such as over-fire air are utilized to enable lower NOx emissions from the primary fuel while also enriching $O_2$ in the exhaust gas. In the case of coal-fired boilers, the replacement of primary fuel by autothermal oxidation may serve to increase furnace $O_2$ levels beneficially for the purpose of decreasing unburned carbon on fly ash. Such benefits of alternative embodiments of autocatalytic methods in accordance with the present invention may serve to increase overall boiler efficiency while also enhancing the value of byproduct fly ash, possibly avoiding the generation of an otherwise solid waste.

Autocatalytic methods in accordance with the present invention also may beneficially consume $NH_3$ breakthrough from a previous exhaust gas treatment using SNCR, for example. In such embodiments, autocatalytic methods in accordance with the present invention may serve to replace the use of SCR as a means for controlling $NH_3$ breakthrough from SNCR. Such uses of embodiments of the present invention, however, also may preferably apply autocatalytic methods as provided herein in place of SNCR in order to reduce NOx more selectively. It is submitted that, as one exemplary advantage, the better selectivity of autocatalytic method, as provided herein may greatly decrease the introduction and cost of reductant(s), while substantially depleting both CO and $NH_3$, and reducing NOx emissions to low levels.

Since autocatalytic methods in accordance with the present invention may reduce NOx emissions below most regulatory requirements, application of the present invention may replace the need for expensive catalysts altogether. Such autocatalytic activity for removing $NH_3$ and CO along with NOx may be self-sustained and conducted in a manner so as to not deteriorate with use like solid catalysts. As a result, autocatalytic methods in accordance with the present invention may avoid the need to replace existing catalysts poisoned by exhaust contaminants.

If emissions regulations require additional NOx reductions, then autocatalytic methods in accordance with the present invention may serve to enhance SCR applications while minimizing catalyst volume. In addition to reducing NOx before SCR, autocatalytic methods as provided herein also may decrease contaminants such as hydrocarbons and soot which may foul catalytic surfaces. In such embodiments utilizing a combination of treatments, autocatalytic methods as provided herein may enable the use of more efficient or cost-effective catalyst beds due to both contaminant removal and the control of exhaust gas temperatures.

In a preferred combination of autocatalytic and catalytic reduction methods, autothermal heating may continuously decrease hydrocarbon and soot contaminants while controlling the exhaust gas temperature to the catalyst. Emissions of NOx may be maintained at a desired level using a separate injection of $NH_3$ ahead of the catalyst to minimize reductant (s) introduced to the autocatalytic method. Since autocatalytic NOx reduction need not exceed about 80–90%, reductant(s) may be consumed nearly stoichiometrically, and CO emissions may be substantially depleted in the shortest time possible.

Accordingly, it is an object of the present invention to address problem, limitations and disadvantages of prior techniques of NOx reduction from exhaust gases produced by a variety of industrial processes.

It is another object of the present invention to provide practical and low-cost methods of NOx removal in a variety of industrial processes, which may utilize a variety of commercially-available reductants.

It is another object of the present invention to provide practical and low-cost methods of NOx removal in a variety of industrial processes, which may deplete $NH_3$ and CO in a substantially concurrent manner.

It is yet another object of the present invention to provide NOx reduction methods which do not require solid catalytic surfaces or hazardous materials.

It is a further object of the present invention to provide methods of NOx removal that may be selective and conducted nearly stoichiometrically in the gas phase.

Finally, it is an object of the present invention to provide autothermal, autocatalytic NOx reduction methods in a wide variety of industrial processes, and also to various systems and apparatus for carrying out the same.

BRIEF DESCRIPTION OF THE DRAWINGS

The above-mentioned features, objects, and attendant advantages of the present invention may be better appreciated and understood when considered in connection with the accompanying drawings, wherein:

FIG. 7 is a diagram illustrating embodiments of the present invention in which hydrocarbon(s) are introduced to autoignite and autothermally heat an exhaust gas while reductant(s) are introduced to generate $NH_3$, HNCO or an combination thereof so that NOx is reduced selectively while CO and $NH_3$ are both depleted substantially, as may be conducted in a single-stage treatment under fuel-lean conditions wherein the exhaust gas contains at least about 1% $O_2$;

DETAILED DESCRIPTION OF PREFERRED EMBODIMENTS

The present invention will now be described in greater detail with reference to particular preferred and alternative embodiments. Such description is for a more complete understanding of the background, utility and application of the present invention, and is without being bound by any particular theory or the like.

Figure 1A:
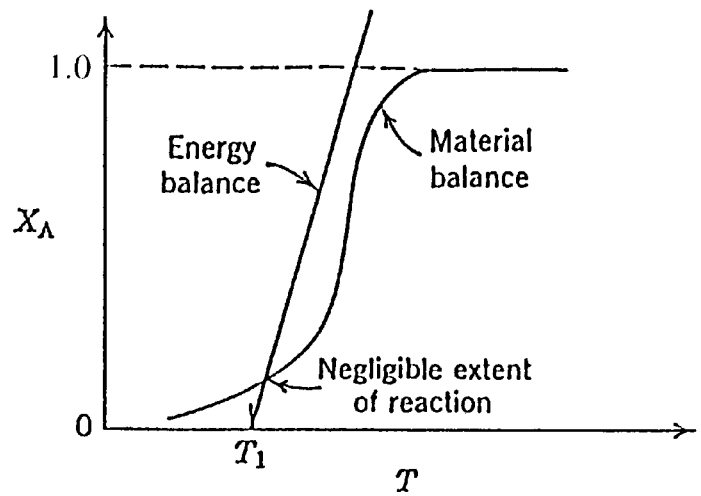
FIGS. 1(a) to 1(c) are graphs reproduced from "Chemical Reaction Engineering" by Octave Levenspiel, John Wiley and Sons, Inc., 1962, p. 228 (Library of Congress Catalog Card Number: 62–15185), and which serve to illustrate distinguishing characteristics of self-sustained autothermal reactions as are utilized in accordance with embodiments of the present invention.
Figure 1B:
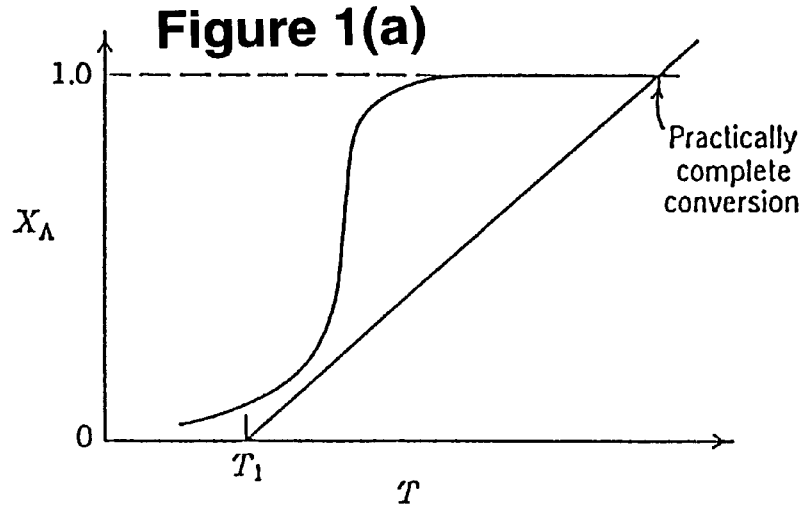
Figure 1C:
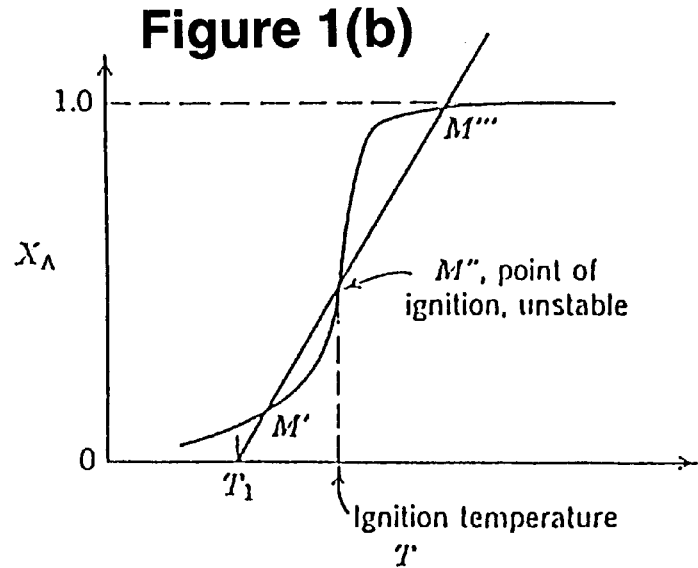

Referring to FIGS. 1(a) to 1(c), the material balance curves illustrate the characteristic relationship between temperature and conversion of reactants for exothermic, irreversible reactions. The alternative energy balance lines in FIGS. 1(a), (b), and (c) illustrate the potential adiabatic heat release starting from the same initial temperature T. As will understood in the art, the actual conversion and heating depend on satisfying the material and energy balances simultaneously as represented by the points of intersection, which may described as follows.

In FIG. 1(a), the initial temperature and amount of reactants are insufficient for self-sustained adiabatic heating beyond the point of intersection. The extent of reaction remains negligible because the heating required to sustain the reaction exceeds the potential amount of heat release from the reaction. In FIG. 1(b), the larger amount of heat release enables practically complete conversion starting from the same initial temperature. In this case, a high final temperature necessarily results from the high heat release starting at a temperature lower than the ignition temperature as described below. FIG. 1(c) illustrates the significance of ignition as a limiting condition for self-sustained adiabatic heating using less heat release. At any initial temperature less than the ignition condition, the heating required to sustain the reaction exceeds the heat release, so the reaction can never proceed adiabatically beyond point M', similar to FIG. 1(a). Appreciable conversion is self-sustained only when the reactants are first ignited; then, the same heat release may self-sustain nearly complete conversion as illustrated by point M'".

Hydrocarbon(s) and CO are known to oxidize by exothermic, irreversible reactions. The heat release from these reactions may self-sustain the conversion of fuels in combustion equipment. Such combustion using excess air produces exhaust gases at high temperatures where the reactant fuel and $O_2$ are typically preheated above the ignition temperature using a stabilized flame. Such hot oxidizing gases, however, generate NOx emissions thermally and convert fuel nitrogen, including $NH_3$ and HNCO, to form NOx.

Such hot oxidizing conditions are avoided by limiting the conversion of reactants in previous teachings related to noncatalytic NOx reduction. According to such teachings, the conversion is limited by a deficiency in either $O_2$ or the ancillary reducing material. Referring again to FIGS. 1(a) to 1(c), it may be understood that either of these deficiencies limits both the heat release and the self-sustaining conversion of reactants. The limited conversion, however, tends to necessarily result in the production of air pollutants as described previously.

Such teachings, for example, generally correspond to the introduction of $NH_3$, HNCO or hydrocarbon(s) into an $O_2$-deficient, fuel-rich exhaust gas or the use of stratified fuel mixtures to generate partial oxidation products. In accordance with such teachings, the partial oxidation products reduce NOx directly under $O_2$-deficient, fuel-rich conditions or lower the effective temperature for selective NOx reduction by $NH_3$ and HNCO in the presence of excess $O_2$.

As previously explained, according to these teachings: "Where it is desired to lower the operating temperature to a greater degree, larger amounts of CO or other H atom generating species will be added or vice-versa." As discussed in connection with FIGS. 1(a) to 1 (c), however, larger amounts of ancillary reducing materials must be converted incompletely in order to lower the operating temperature. Similarly, the reported inhibition of CO oxidation by $NH_3$ and HNCO must necessarily decrease the adiabatic heating of an exhaust gas containing excess $O_2$.

According to such teachings, the production of byproduct air pollutants is avoided only by removing CO prior to the injection of $NH_3$ or HNCO. Such teachings, however, tend to require higher temperatures in the range of 1600–2000° F. for noncatalytic NOx reduction unless hydrogen is used as the ancillary reducing material. Although hydrogen may lower the effective temperature to reduce NOx noncatalytically without producing other air pollutants, this technique is limited as previously described.

Such previous teachings do not appear to appreciate the possibility of an ignition condition for self-sustaining gas-phase reactions to reduce NOx selectively. Contrary to such previous teachings, $NH_3$, HNCO or a combination thereof may be utilized for effective autocatalytic NOx reduction when hydrocarbon(s) autoignite and heat an exhaust gas autothermally under fuel-lean conditions wherein the exhaust gas contains at least about 1% $O_2$. Such unique features, aspects and attributes of the present invention will become more apparent to those skilled in the art by the following discussion, referring to the figures and tables discussed below.

Figure 2:
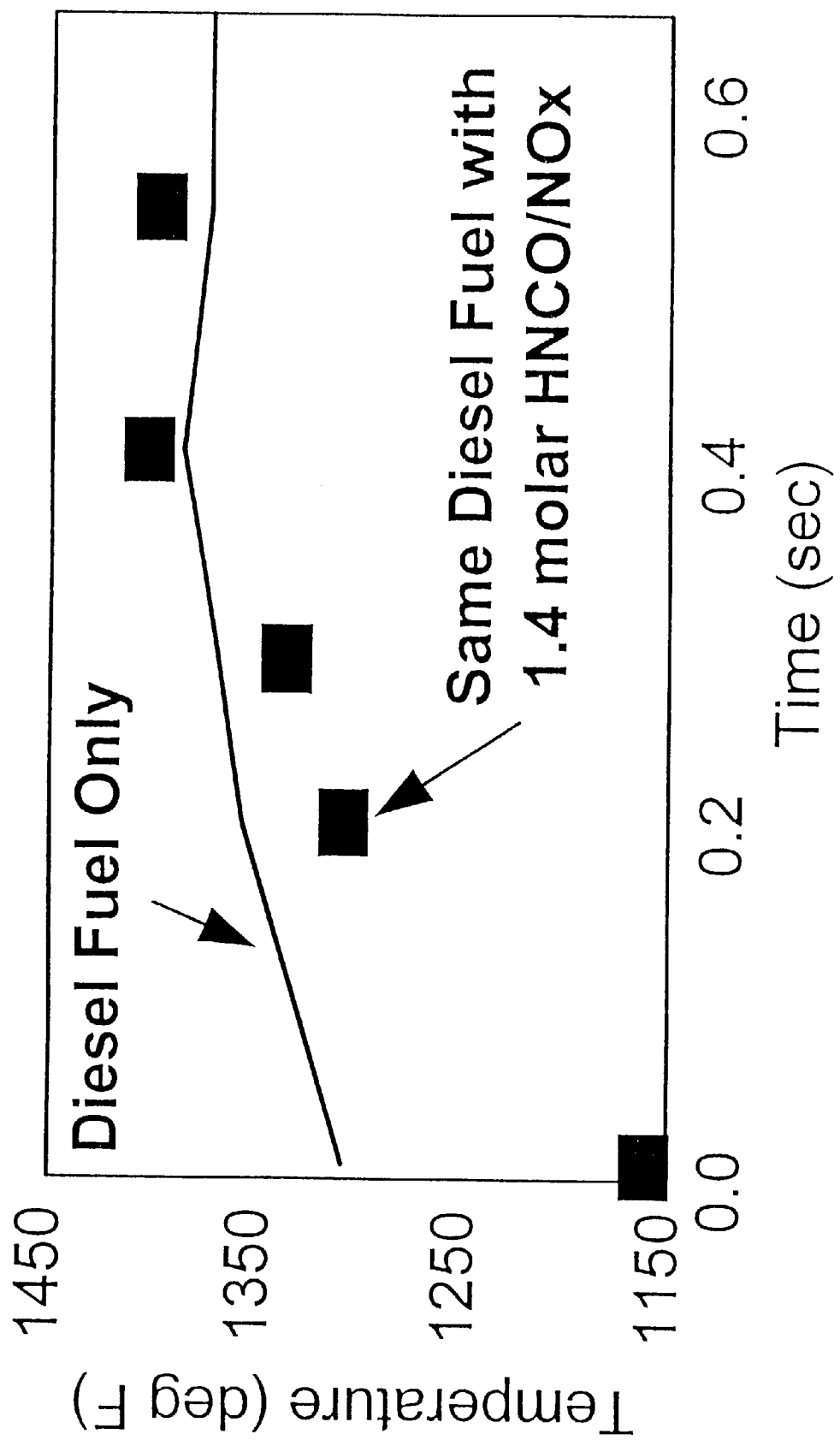
FIG. 2 illustrates the effects of $NH_3$ and HNCO on the autoignition and autothermal heat release of hydrocarbon(s) under fuel-lean conditions in an exhaust gas initially containing about 10% $O_2$.

FIG. 2 illustrates the autothermal heating of an exhaust gas containing about 10% $O_2$ and 1555 ppm NOx at an initial temperature of about 920° F. The exhaust gas was produced by a heavy duty high speed diesel engine. The solid line in FIG. 2 shows the temperature profile when diesel fuel alone was injected to autoignite and autothermally heat the exhaust gas. Temperatures measured using stainless-sheathed type K thermocouples along the gas flow-path never reached 1400° F. when diesel fuel was injected alone. The final exhaust gas composition contained about 7.6% $O_2$, and the initial NOx level was not reduced appreciably by the diesel fuel injection at this high $O_2$ level.

The solid rectangles in FIG. 2 illustrate the measured temperatures when cyanuric acid was injected in addition to the diesel fuel. The cyanuric acid was injected to decompose and generate HNCO at a molar ratio of about 1.4 with respect to the initial NOx in the exhaust gas. The lower temperatures in comparison with diesel fuel alone at residence times less than about 0.4 seconds indicate that the introduction of HNCO slowed the initial autothermal heating of the exhaust gas using the same amount of diesel fuel. The additional introduction of HNCO eventually resulted in a higher temperature in excess of 1400° F. after about 0.4 seconds, indicating more autothermal heating than the diesel fuel alone. In addition, the NOx emissions were reduced more than 90%, and the final CO concentration increased from about 185 ppm to about 520 ppm.

As illustrated in FIG. 2, the introduction of HNCO increased the final temperature for autothermal heating of the exhaust gas in comparison with injecting the same amount of diesel fuel alone. Since the HNCO contributed over 2000 ppm of reactant CO, the much smaller increase of only 335 ppm in the final CO concentration demonstrated a greater conversion of CO in comparison with the same introduction of diesel fuel alone. These results demonstrate a uniquely greater conversion of both NOx and CO concurrently in accordance with the present invention.

The initially lower temperatures with HNCO generation illustrated in FIG. 2 greatly exceed any cooling effects related to the decomposition and vaporization of cyauric acid. These lower temperatures reflect an initially slower rate of heat release from the diesel fuel due to the generated HNCO. This initial inhibition of the autothermal heating did not last more than about 0.4 seconds. After this initial inhibition, the exhaust gas was heated faster to temperatures above about 1400° F., and both the NOx and CO were substantially depleted as a result of the HNCO generation during the autothermal heating.

These experimental results support a uniquely autocatalytic NOx reduction distinctly different from the previous teachings. As described by Levenspiel, autocatalytic reactions are distinguished by the self-sustained conversion of reactants which initially starts slowly as illustrated in FIGS. 1 and 2. In these reactions, at least one reaction product acts as a catalyst. The reactions proceed faster with formation of the catalyst and continue until reactants are depleted substantially.

When NOx emissions are reduced autocatalytically, reductant(s) and hydrocarbon(s) are both substantially converted by reactions which release heat autothermally as illustrated in FIGS. 1 and 2. The exhaust gas temperature is increased by adding either more reductant(s) or more hydrocarbon(s). This is contrary to the previous teachings where larger amounts of ancillary reducing materials are added to lower the temperature for NOx reduction or where reductant(s) are added under $O_2$-deficient, fuel-rich conditions, etc.

Similar single-stage experiments were performed using an exhaust gas from another diesel engine. This exhaust gas was preheated in the range of about 1100–1300° F. by the combustion of supplemental fuel. The supplemental fuel was combusted completely so that the preheated engine exhaust gas contained virtually no CO, and about 8.7% $O_2$ and 700 ppm NOx.

The NOx emissions were reduced autocatalytically by introducing diesel fuel and cyanuric acid after the exhaust preheating. By preheating the exhaust gas, less diesel fuel was needed for autoignition and autothermal heating to final temperatures in the range of about 1385–1425° F. Using less diesel fuel in comparison with the results illustrated in FIG. 2 actually increased the selectivity of NOx reduction as illustrated in FIG. 3.

Figure 3:
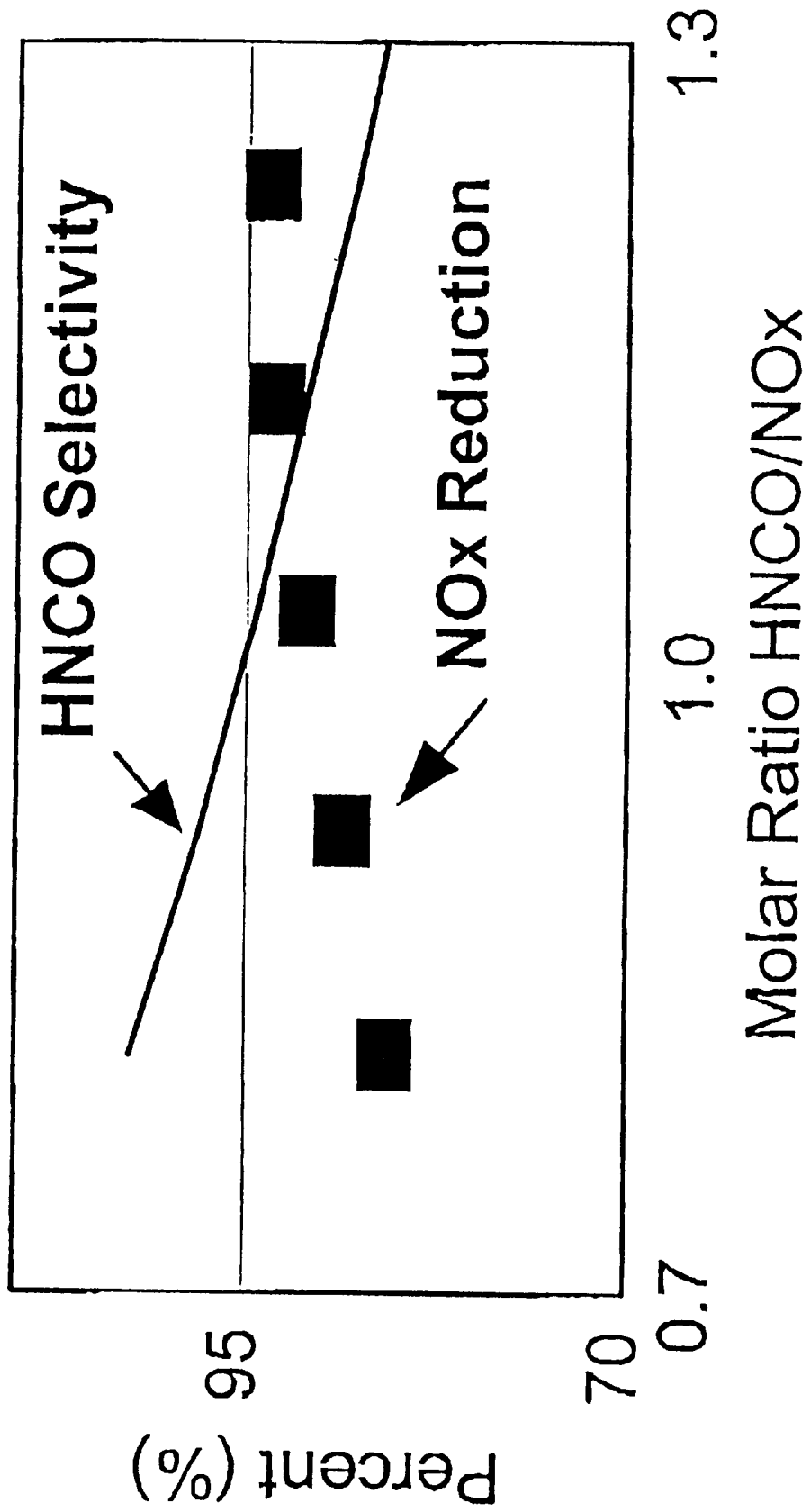
FIG. 3 illustrates the selective reduction of NOx by HNCO while introduced hydrocarbon(s) autoignite and autothermally heat an exhaust gas containing in tie range of about 5–9% $O_2$.

FIG. 3 illustrates the selectivity and levels of NOx reduction in these single-stage autocatalytic treatments when the exhaust gas was preheated in the range of about 1240–1270° F. The initial NOx level of about 700 ppm was reduced as much as about 95% to levels as low as about 31 ppm. The NOx was reduced about 80–90% nearly stoichiometrically, and this nearly 100% selectivity declined only gradually when more HNCO was added to reduce NOx further.

Figure 4:
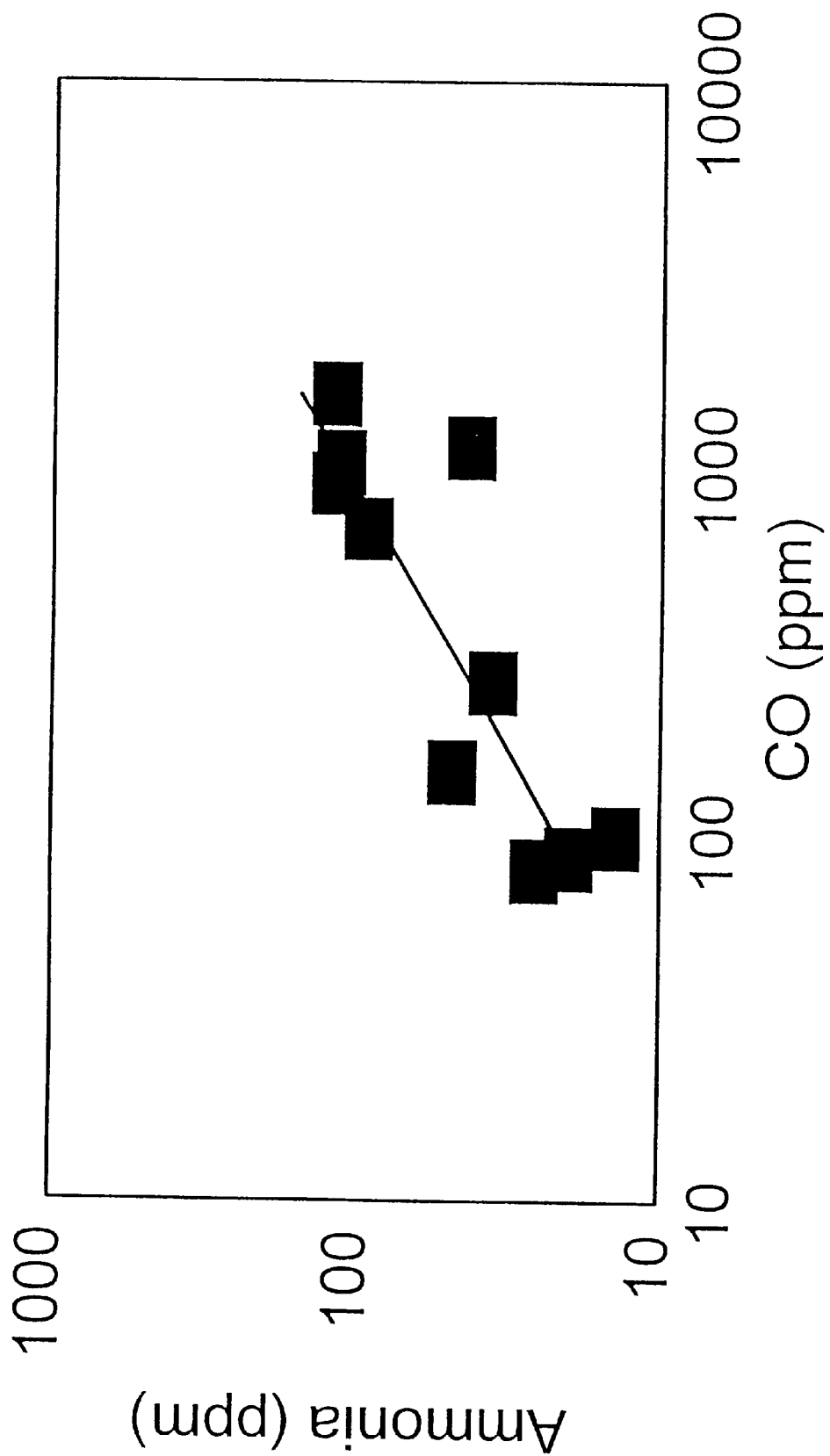
FIG. 4 illustrates the substantial concurrent depletion of CO and $NH_3$ by self-sustaining autocatalytic reactions in an exhaust gas in accordance with embodiments of the present invention, wherein hydrocarbon(s) autoignite and autothermally heat the exhaust gas under fuel-lean conditions containing in the range of about 5–9% $O_2$.

For molar ratios of HNCO with respect to NOx in the range of about 0.8–1.6, the CO and $NH_3$ were depleted in a substantially concurrent manner as illustrated in FIG. 4. The extent of this concurrent depletion was increased by introducing more diesel fuel so that the exhaust gas was heated autothermally to a higher temperature in the range of about 1385–1425° F. This trend with temperature is illustrated in FIG. 5.

Contrary to previous teachings, the amount of diesel fuel did not change the operating temperature for selective NOx reduction. The autothermal heating of about 480° F. in FIG.

Figure 5:
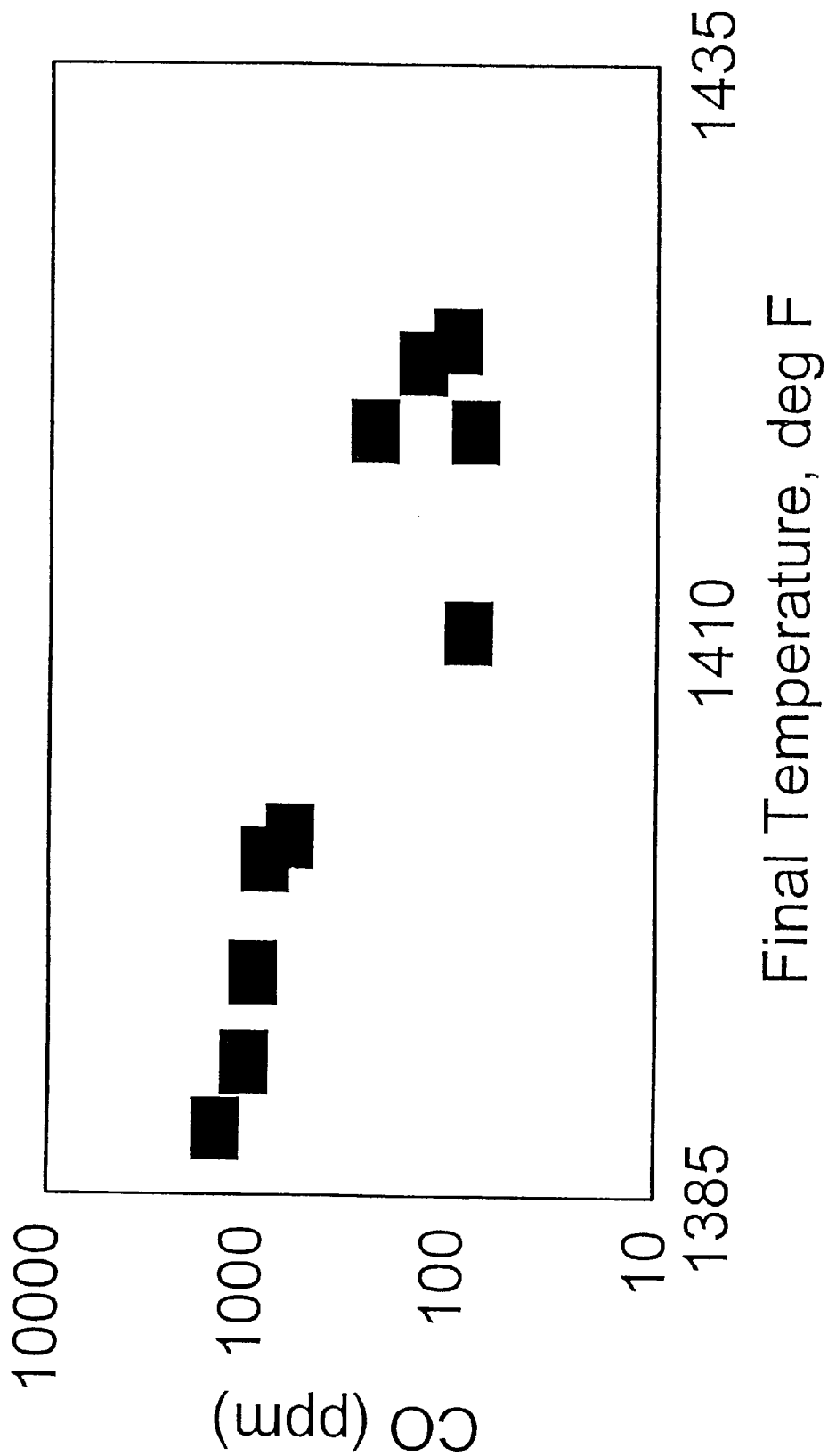
FIG. 5 illustrates increasing depletion of CO in the presence of $NH_3$ at higher temperatures in the range of about 1385–1425° F.

2 was decreased in the range of about 100–300° F. for the experimental results illustrated in FIGS. 3–5. The substantial depletion of CO and $NH_3$ confirmed nearly complete conversion of reactants, and the final operating temperature for NOx removal remained near 1400° F.

As may be understood by the discussion in connection with FIGS. 1(a) to 1(c), autoignition of reactants enables nearly complete conversion at about the same final temperature, regardless of the initial temperature. Higher initial temperatures above the ignition condition decrease the autothermal heat release that is needed for self-sustaining nearly the same conversion of reactants. The aforementioned comparisons of the experimental results in FIGS. 2–5 are indicative of the characteristics of autocatalytic reactions.

Autoignition and autothermal heating represent requirements/conditions to reduce NOx autocatalytically in accordance with the present invention. Without these key conditions, $NH_3$ and HNCO reduce NOx noncatalytically. The previous teachings for noncatalytic NOx reduction preclude any single-stage method for overcoming the limiting inhibition of CO oxidation by $NH_3$ and HNCO, as may be understood from the previous discussion or a review of such prior teachings. The experimental results provided herein, however, clearly demonstrate different conditions of autoignition and autothermal heating advantageously utilized in accordance with the present invention to reduce NOx autocatalytically.

These inventively new conditions for autocatalytic NOx reduction do not depend on solid surfaces to catalyze the reactions. Contrary to previous teachings, the final operating temperature for the gas-phase, autocatalytic reactions does not change in general with the use of alternative reductant(s) or different amounts of hydrocarbon(s). These characteristics of autocatalytic NOx reduction in accordance with the present invention are further evidenced by the comparison of test results in Table 1 below.

TABLE 1

|  | Test 1 | Test 2 | Test 3 | Test 4 |
|---|---|---|---|---|
| Initial Diesel Engine Exhaust |  |  |  |  |
| Temperature, ° F. | 934 | 1243 | 1281 | 1316 |
| NOx, ppm | 1550 | 700 | 700 | 700 |
| Final Treated Exhaust |  |  |  |  |
| Temperature, ° F. | 1444 | 1471 | 1429 | 1482 |
| $O_2$, % | 8.0 | 6.2 | 7.8 | 4.5 |
| NOx, ppm | 64 | 46 | 52 | 54 |
| CO, ppm | 98 | 18 | 93 | 54 |
| Reductant (Source of HNCO) | Mix | CYA | CYA | Urea |
| Molar Ratio (HNCO/NOx) | 1.1 | 1.1 | 1.1 | 0.8 |
| Reaction Residence Time, sec | 0.7 | 0.4 | 0.7 | 0.4 |
| Reaction Chamber Lining | SS | SS | CF | CF |

SS = Stainless Steel; CF = Ceramic Fiber

Test 1 was performed using the same exhaust gas and reaction chamber corresponding to the results illustrated in FIG. 2. This reaction chamber is lined with stainless steel and contains stainless steel baffles. Tests 2–4 were performed using the same exhaust gas and reaction chamber corresponding to the results illustrated in FIGS. 3–5. This reaction chamber is lined with ceramic fiber insulation and contained stainless steel internals which were removed only for Tests 3 and 4. Cyanuric acid powder (CYA) was injected pneumatically in Tests 2 and 3 as the source of HNCO. An aqueous solution containing about 25% by weight urea was injected as the source of HNCO in Test 4. A powdered product of urea decomposition (Mix) was injected pneumatically in Test 1. This mixed source of HNCO was estimated to contain about 25% cyanuric acid along with 75% biuret and urea for calculating the molar ratio of HNCO with respect to NOx.

Tests 1–4 were all performed nearly adiabatically using diesel fuel injection to control the final temperature of the autothermal heating. The injection of diesel fuel was decreased in Tests 2–4 where the engine exhaust was preheated prior to the introduction of the diesel fuel and reductant(s). The final $O_2$ concentrations reflect differences in the pneumatic conveying of powdered reductant(s) and the exhaust gas preheating as well as the amount of (diesel fuel injected to autoignite and heat the exhaust gases autothermally.

Despite the differences in exhaust gas composition and preheating, reaction chamber materials and residence times, and the chemical composition of reductant(s), the NOx and CO emissions were always reduced in a substantially concurrent manner. Higher final temperatures in the narrow range of about 1400–1500° F. converted the reactants to similarly low levels over a wide range of initial NOx concentrations and autothermal heat releases.

As illustrated by the data in Table 1, higher final temperatures for the autothermal heating primarily depleted the reactants in shorter residence times. This depletion of reactants included $NH_3$ even when the $NH_3$ was generated in large amounts by the thermal decomposition of urea. In fact, the results of Test 4 demonstrate NOx reduction in excess of the HNCO generated from urea, indicative that high $NH_3$ levels may be effective for reducing NOx autocatalytically in accordance with the present invention.

The comparisons in Table 1 are based on the molar ratio of HNCO with respect to NOx because of the uncertainty in estimating the generation of $NH_3$ from the mixture of urea decomposition products. This uncertainty is removed when urea and cyanuric acid are compared directly in FIG. 6. For this comparison, the molar ratios are based on generating equal amounts of $NH_3$ and HNCO from urea, as reported in Combust. Sci. and Tech., Vol. 65, 1989.

Figure 6:
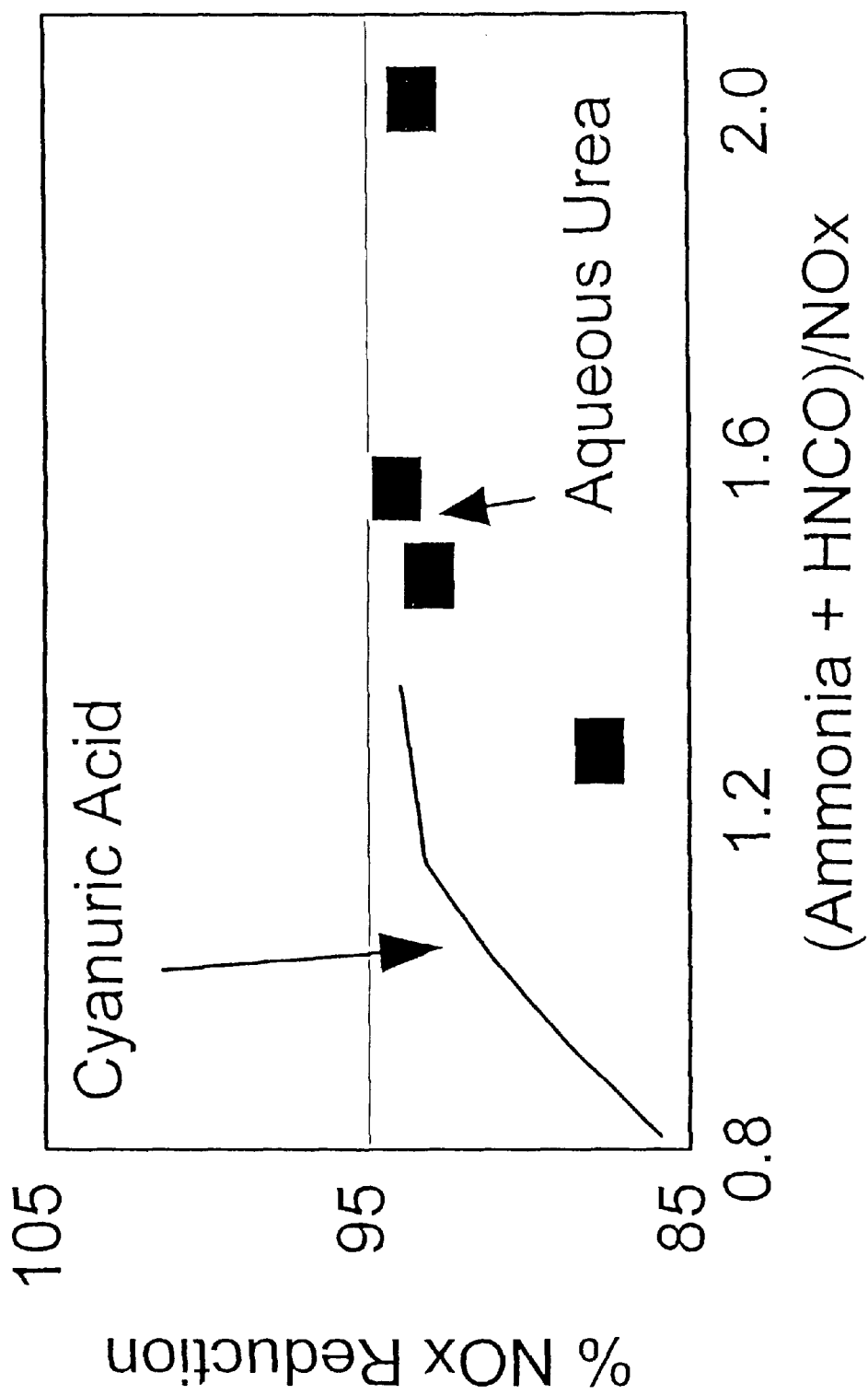
FIG. 6 compares the selective reduction of NOx using cyanuric acid powder and aqueous urea solutions as alternative reductant(s) for generating $NH_3$ and HNCO to reduce NOx autocatalytically in accordance with embodiments of the present invention.

On this basis, $NH_3$ reduces NOx autocatalytically less selectively than HNCO as illustrated in FIG. 6. The data from FIG. 3 are repeated in FIG. 6 for direct comparison of the similar experiments. The urea was tested in place of the cyanuric acid by injecting an aqueous solution containing about 25% by weight urea. While the generated mixture of $NH_3$ and HNCO reduced NOx less selectively than HNCO alone, the NOx was reduced autocatalytically to the same low level using urea or cyanuric acid interchangeably.

An independent source test contractor analyzed the engine exhaust gas both before and after Test 1 in Table 1. These analyses for typical combustion byproducts are summarized in Table 2 below. As illustrated by these results, autocatalytic NOx reduction in accordance with the present invention does not produce any significant amount of typical contaminants in combustion exhaust. In fact, the autothermal reactions with autocatalytic methods for NOx reduction as provided herein may actually lower other typical exhaust contaminants besides NOx.

TABLE 2

| | Baseline Engine Exhaust | Test 1 Byproduct Results |
|---|---|---|
| CO, ppm | 210 | 98 |
| CH4, ppm | 3.2 | 2.6 |
| HCN, ppm | 0.079 | 0.087 |
| Solid PM, gr/dscf | 0.0099 | 0.0096 |
| Total PM, gr/dscf | 0.0167 | 0.0139 |
| organics, ppm (non-CH$_4$) | 0.5 | 0.5 |

Similar results were obtained in applying autocatalytic methods of NOx reduction in accordance with the present invention to preheated exhaust gas from a 4000 bhp medium speed diesel electric generator with a capacity of about 2.8 MW. In this case, the engine exhaust was produced at temperatures below about 600° F. and was preheated above about 1000° F. using a heat exchanger.

The final temperature of the autocatalytic NOx reduction was maintained at about 1400° F. by controlling the introduction of diesel fuel in the preheated exhaust. The heat exchanger cooled the treated exhaust by preheating the engine exhaust. Supplemental fuel was fired in a burner to preheat the engine exhaust initially as a means for starting the heat recovery.

The preheated exhaust was introduced to the reaction chamber through a round duct with a 36-inch inside diameter. The diesel fuel and powdered cyanuric acid were introduced into this duct. The diesel fuel was dispersed in the exhaust gas using pressure atomization from a single liquid spray nozzle. The cyanuric acid powder was introduced pneumatically.

In this particular example, the preheated engine exhaust contained more than about 13.5% O$_2$ at temperatures above about 1000° F. Under these conditions, stratified ignition was prevented by swirling the entire flowrate of exhaust gas which totaled nearly 13,000 dscfm. Uniform autoignition and autothermal heating were verified visually by the appearance of a chemiluminescence with a substantially uniform blue color as the exhaust gas entered the open reaction chamber.

The reaction chamber consisted of a round open vessel lined with ceramic fiber insulation. The inside diameter of the insulation lining was about 7 feet. The blue chemiluminescence was observed to appear in the large open gas space. The exposed surfaces in the large open vessel were negligible for catalyzing any reactions. The residence time for gas-phase reactions in the open vessel was about 1.3 seconds.

Emissions source tests were performed by an independent contractor. These measurements confirmed the previous test results as illustrated in Table 3. At the relatively long residence time of about 1.3 seconds, the NH$_3$ breakthrough was depleted below about 2 ppm, while the CO was depleted below about 50 ppm at the final temperature of about 1400° F. In addition, the particulate emissions were decreased concurrently by nearly 70%.

TABLE 3

| | 4000 bhp baseline exhaust | 2.8 MW treated exhaust |
|---|---|---|
| Engine Fuel, lb/hr | 1347 | 1368 |
| Engine Exhaust, ° F. | 559 | 599 |
| Preheated Exhaust, ° F. | | 1046 |
| Final Reaction, ° F. | | 1400 |
| Cyanuric Acid, lb/hr | | 79.1 |
| Exhaust Flowrate, dscfm | 12,974 | 12,970 |
| O$_2$, % | 13.78 | 11.5 |
| CO$_2$, % | 5.15 | 7.0 |
| NOx (15% O$_2$), ppmc | 481 | 45.7 |
| CO, ppm | 47.0 | 49.2 |
| NH$_3$, ppm | | 1.8 |
| Particulates, gr/dscf | 0.0196 | 0.0061 |

The treated NOx levels were measured before the cooled exhaust was discharged to the atmosphere. The rate of cyanuric acid introduction was controlled to maintain a treated NOx level. This NOx level was maintained over a range of engine loads based on both NOx and load measurements. The NOx emissions were maintained below a regulatory compliance level using these measurements either individually or collectively.

These consistent results using different reactor configurations confirm the characteristic features of NOx reduction by gas-phase autocatalytic reactions in accordance with the present invention. Contrary to previous teachings, all of the reactants including NH$_3$, HNCO, CO and hydrocarbon(s) may be depleted in a substantially concurrent manner in a single-stage treatment. Also, autocatalytic treatment in accordance with the present invention may substantially reduce levels of typical contaminants in combustion exhaust gases.

The concurrent depletion of reactants clearly is indicative of an autocatalytic mechanism as described by Levenspiel. The key ignition condition for self-sustained autocatalytic reactions is supported visually by the appearance of a substantially uniform blue chemilurminescence. Contrary to previous teachings, such autocatalytic reaction conditions in the presence of excess O$_2$ do not necessarily oxidize NH$_3$ or HNCO to form NOx.

The experimental results produced by Applicants indicate that NH$_3$, HNCO or a combination thereof may be effective for autocatalytic NOx reduction in accordance with the present invention when hydrocarbon(s) autoignite and heat an exhaust gas autothermally under fuel-lean conditions wherein the exhaust gas contains at least about 1% O$_2$. Under such conditions, reactants including NOx, NH$_3$, HNCO, CO, hydrocarbon(s) and other typical exhaust contaminants may be reduced in a substantially concurrent manner.

This concurrent conversion of reactants conflicts with previous teachings for noncatalytic NOx reduction. According to these teachings, CO oxidation is limited by the inhibiting effects of NH$_3$ or HNCO. This limiting conversion of reactants is previously described to produce air pollutants unless hydrogen is used as the ancillary reducing material for lowering the effective temperature to reduce NOx selectively, etc.

In accordance with the present invention, both NH$_3$ and CO may be depleted together when the autocatalytic reactions are self-sustained to a final temperature in the range of about 1400–1550° F. Unexpectedly, NH$_3$ may be depleted below even 2 ppm concurrently with CO removal below about 50 ppm. The concurrent removal of $NH_3$ and CO is illustrated in FIG. 4 and is unique to the autocatalytic reaction method. Based on this characteristic relationship, CO measurements may be used to reliably indicate the level of $NH_3$ breakthrough, and in certain preferred embodiments a CO measurement is used in an industrial process to determine whether $NH_3$ breakthrough is occurring and/or is exceeding a predetermined level.

Higher final temperatures in the range of about 1400–1550° F. primarily deplete the reactants autocatalytically in a shorter residence time when the exhaust gas is preheated above about 900° F. A maximum residence time of about 1.5 seconds is decreased below about 1.0 seconds by preheating the exhaust gas above about 1050° F. Also, the residence time is decreased below about 0.5 seconds by preheating the exhaust gas above about 1200° F.

The autocatalytic reactions described herein, unexpectedly, may be effective for reducing NOx selectively when the exhaust gas is heated autothermally to the temperature range of about 1400–1550° F. This range of final temperatures is not highly dependent on the amount of hydrocarbon(s) introduced to autoignite and heat the exhaust gas autothermally, This conflicts with the previous teachings, where larger amounts of ancillary reducing materials are added to lower the effective temperature for NOx reduction by $NH_3$ and HNCO.

In accordance with the present invention, emissions of NOx may be reduced autocatalytically using $NH_3$, HNCO or a combination thereof. The NOx emissions are reduced about 80–90% to about 50–200 ppm using $NH_3$ and HNCO nearly stoichiometrically. Furthermore, NOx emissions may be reduced by as much as 99% to levels as low as about 10 ppm using no more than about twice the stoichiometric ratio of $NH_3$ and HNCO with respect to NOx. The NOx emissions may be reduced selectively using a molar ratio of $NH_3$ and HNCO together with respect to NOx in the range of about 0.5–2.0.

Contrary to previous teachings, cyanuric acid, urea and $NH_3$ may be used in a substantially interchangeable manner for reducing NOx autocatalytically. When hydrocarbon(s) autoignite and heat the exhaust gas autothermally to temperatures in the range of about 1400–1550° F., reductant(s) which generate(s) $NH_3$, HNCO or a combination thereof may be effective for reducing NOx to a low level in accordance with the present invention.

Uniform distribution of NOx, hydrocarbon(s) and reductant(s) is preferred to maintain fuel-lean conditions for the autoignition, autothermal heating and selective NOx reduction. Contrary to previous teachings, stratified fuel mixtures or other methods of staging fuel-rich combustion do not benefit selective NOx reduction. These previous teachings appear to adversely extinguish the conversion of reactants, which tends to result in the production of other air pollutants in addition to decreasing the selectivity of NOx reduction in comparison with the new, single-stage autocatalytic methods described herein.

As illustrated in FIG. 7, autocatalytic methods in accordance with the present invention may be implemented in a single stage. The hydrocarbon(s), reductant(s) and exhaust gas may be mixed together for autoignition, autothermal heating and selective NOx reduction. Preferably, the exhaust gas should contain about 2–18% $O_2$ at a temperature in the range of about 900–1600° F. for the spontaneous ignition and autothermal heating to deplete the generated reactants substantially. The wavy arrows in FIG. 7 represent the mixing or other dispersion of reactants to maintain fuel-lean conditions wherein the exhaust gas contains at least about 1% $O_2$.

The exhaust gas mixing may start before or after the introduction of hydrocarbon(s) and reductant(s), and the mixing may extend throughout a portion, or even all, of the autothermal heating. Baffles or swirl vanes may modify the exhaust gas flowpath to mix the reactants. One or more spray nozzles may disperse the hydrocarbon(s) and reductant(s) substantially throughout the cross-section of the exhaust gas flowpath. Preferably, the mixing, dispersion or combination thereof should establish a substantially uniform exhaust gas composition before the appearance of a chemiluminescence.

In accordance with the present invention, the reductant(s) may comprise material(s) selected from the group consisting of $NH_3$, HNCO, urea, decomposition products of urea, cyanuric acid or a tautomer of cyanuric acid, compounds which decompose to produce $NH_3$ as a byproduct, ammonium salts of organic acids, hydrocarbon amines or combinations of the foregoing, whether pure compounds or mixtures, as solids, liquid melts, emulsions, slurries or solutions in water, alcohols, hydrocarbons or oxygenated hydrocarbon solvents.

In general, only the selectivity of NOx reduction and the conversion of NOx to $N_2O$ depend significantly on the chemical reductant(s). While NOx reduction by $NH_3$ generates less byproduct $N_2O$ emissions, HNCO removes NOx more selectively. In either case, preferably a molar ratio of $NH_3$ and HNCO together in the range of about 0.5–2.0 with respect to NOx may be utilized for effective reduction of NOx as much as 99% to levels in the range of about 10–200 ppm.

The introduction of reductant(s) preferably is controlled to maintain a level of NOx reduction or a final NOx emissions level in the treated exhaust gas. In certain preferred embodiments, continuous measurements of NOx emissions are used to increase or decrease the introduction of reductant(s) as a part of a feedback control system for maintaining a final NOx emissions level (set at a desired, predetermined level, for example). Alternatively, NOx emissions source tests can establish characteristic relationships between operating conditions for the combustion equipment and the introduction of reductant(s) needed for a desired level of NOx reduction. Based on these relationships, the continuous monitoring of operating conditions can be used for feedforward control of the NOx emissions reduction. Also, combinations of feedback and feedforward control can reliably maintain final NOx emissions levels despite variations in the exhaust gas flowrate and baseline NOx levels during combustion operations.

Hydrocarbon(s) utilized in accordance with embodiments of the present invention may comprise material(s) selected from the group consisting of hydrocarbon mixtures such as natural gas, liquefied petroleum gas, alcohols, gasoline, diesel fuel, aviation turbine fuel, various oxygenated hydrocarbons, hydrocarbon amines or any fraction of such mixtures, including purified components such as carbon monoxide, methane, propane, methanol, and ethanol, whether introduced as liquids or vapors. In addition, the hydrocarbon(s) may include the same liquid, gaseous or vaporous fuels that are combusted to produce the exhaust gas containing NOx.

Autocatalytic methods in accordance with the present invention in general do not depend on the order in which the reductant(s) and hydrocarbon(s) are introduced into the exhaust gas. Within the temperature range of about 900–1600° F., the introduced hydrocarbon(s) autoignite spontaneously under fuel-lean conditions of about 2–18% $O_2$ in the exhaust gas. The $NH_3$, HNCO or combination thereof may be introduced or generated from reductant(s) at any time before or during the fuel-lean autothermal conversion of hydrocarbon(s) and CC) in the exhaust gas.

Self-sustaining autothermal reactions in the gas phase as utilized herein tend not to be adversely affected by other exhaust gas contaminants, including gaseous organics, particulate matter or CO. In fact, such autothermal reactions may serve to at least partially remove these typical exhaust contaminants. This conversion of contaminants may reduce objectionable emissions while decreasing the amount of hydrocarbon(s) required to maintain a final temperature for depleting CO and $NH_3$ breakthrough in a substantially concurrent manner.

In preferred embodiments, the introduction of hydrocarbon(s) is controlled to maintain a final temperature in the range of about 1400–1550° F. The autothermal heat release increases the exhaust gas temperature adiabatically in the absence of heat losses, or in alternative embodiments heat transfer surfaces may recover heat from the exhaust gas during the autothermal heating. In general, the heat recovery should not cool the exhaust gas so excessively as to extinguish the autothermal reactions before the completion of NOx removal and depletion of CO and $NH_3$ breakthrough.

An autothermal heat release equivalent to an adiabatic temperature increase in the range of about 50–500° F. is utilized in preferred embodiments to achieve a final exhaust gas temperature in the range of about 1400–1550° F. for implementing such autocatalytic methods. The amount of hydrocarbon(s) introduced depends primarily on the initial exhaust gas temperature and any recovery of heat released by the autothermal reactions.

Autocatalytic methods in accordance with preferred embodiments typically require residence times no longer than about 1.5 seconds. In general, CO and $NH_3$ are depleted faster when the autothermal heating is initiated at higher temperatures in the range of about 1050–1600° F. With such embodiments, reaction residence times in the range of about 0.02–1.0 seconds may be sufficient to deplete both CO and $NH_3$ substantially. Still higher initial exhaust gas temperatures in the range of about 1200–1600° F. enable substantial CO and $NH_3$ depletion within the range of about 0.02–0.5 seconds.

The introduction of hydrocarbon(s) decreases beneficially when the exhaust gas is preheated to the temperature ranges of about 1050–1600° F. or about 1200–1600° F. In these cases, the autothermal heat release need not exceed an amount equivalent to an adiabatic increase of about 50–350° F. or 50–200° F., respectively, so long as the exhaust gas is heated autothermally to a final temperature in the range of about 1400–1550° F. This preheating of the exhaust also improves the selectivity of NOx reduction.

In general, the initial exhaust gas temperatures do not depend on how the, exhaust gas is preheated or cooled so long as the $O_2$ concentration is maintained in the range of about 2–18% by volume. The exhaust gas may be heated or cooled initially using heat transfer surfaces, including any of various methods for preheating the exhaust gas by recovering heat after the exhaust gas is treated using autocatalytic methods as provided herein. Alternatively, the exhaust gas may be heated directly by the combustion of a supplemental fuel in the exhaust gas.

The combustion of a supplemental fuel using excess air also may serve to enrich the $O_2$ concentration in an otherwise $O_2$-deficient exhaust gas. In this case, the supplemental fuel combustion can serve the dual purpose of preheating the exhaust gas and enriching its $O_2$ concentration. The combustion of a supplemental fuel also may serve to preheat a portion of the exhaust gas to ignite more supplemental fuel which is combusted directly in the exhaust gas. If the exhaust gas is preheated using fuel-rich combustion, autocatalytic methods as provided herein may partially remove additional contaminants from the fuel-rich combustion.

Autocatalytic methods in accordance with the present invention may be used in combination with various modifications to the combustion process for producing the exhaust gas. Such modifications may beneficially lower NOx emissions and maintain exhaust gas temperatures within the range of about 900–1600° F., or preferably about 1200–1600° F., for autocatalytic methods as provided herein, so long as the $O_2$ concentration remains above about 2% by volume. Such modifications also may beneficially decrease the introduction of both reductant(s) and hydrocarbon(s) in such autocatalytic methods.

Figure 8:
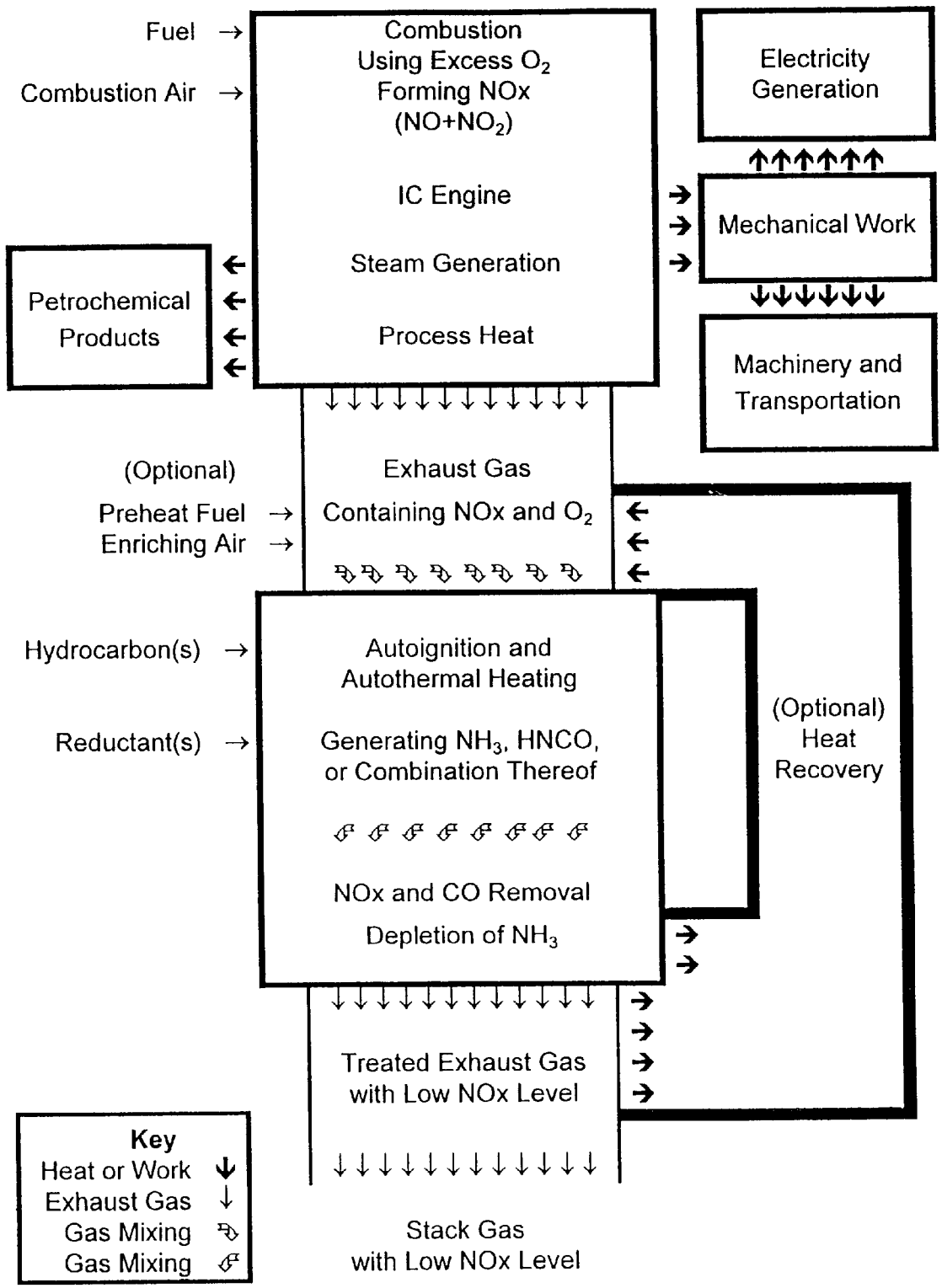
FIG. 8 is a diagram illustrating an embodiment of the present invention wherein a single-stage exhaust gas treatment such as illustrated in FIG. 7 is incorporated with the production of the exhaust gas by combustion equipment, and may additionally include heat recovery, preheating or $O_2$ enrichment in embodiments in which the present invention serves to control NOx emissions while producing petrochemical products, generating electricity or operating machinery or mobile equipment.
Figure 9:
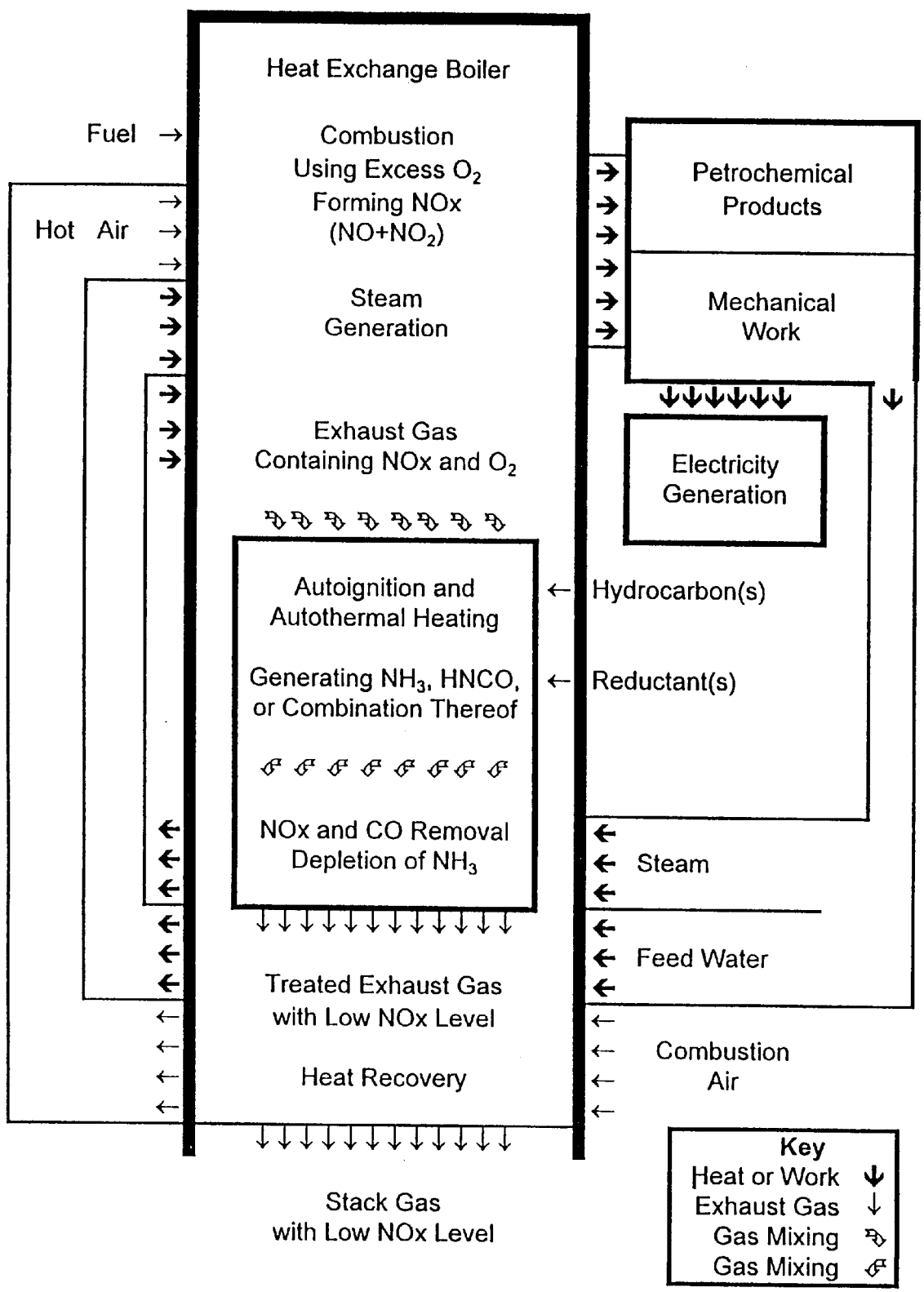
FIG. 9 is a diagram illustrating an embodiment of the present invention wherein a single-stage exhaust gas treatment such as illustrated in FIG. 7 is incorporated with a heat exchange boiler so that heat released in implementing the present invention to control NOx emissions is recovered in conjunction with the production of petrochemical products or the generation of electricity by the heat exchange boiler, and the combustion of fuel in the heat exchange boiler may additionally be modified to control initial NOx and $O_2$ composition of the exhaust gas for implementing the present invention.

Autocatalytic methods such as illustrated in FIG. 7 are implemented in alternative embodiments using any of the various techniques for incorporating the exhaust aftertreatment with combustion equipment as illustrated in FIGS. 8 and 9. Autocatalytic methods in accordance with the present invention also may be implemented in conjunction with the primary combustion process so that the autothermal heat release is recovered beneficially as illustrated in FIG. 9. For example, existing or new surfaces in a heat exchange boiler are used in certain embodiments to also recover the autothermal heat release produced with autocatalytic methods as provided herein to replace primary fuel, and may be used, for example, for the purpose of generating steam and/or electricity, or cracking petrochemicals, or the autothermal heating may serve to increase the generating capacity of an existing boiler, etc., as illustrated. In such embodiments, mechanical work is conducted, petrochemicals are cracked or otherwise processed, steam and/or electricity is generated, heat recovered etc., which may be conducted under conditions that in general are optimized for the primary process. Use of autocatalytic methods in accordance with the present invention effectively enables the NOx reduction to be dissociated from the primary process, and thereby enabling the primary process to be conducted in a more optimum manner.

Combustion modifications such as over-fire air may be used to enable lower NOx emissions from the primary fuel while also enriching $O_2$ in the exhaust gas. In the case of coal-fired boilers, the replacement of primary fuel by autothermal heating may serve to increase furnace $O_2$ levels beneficially for the purpose of decreasing unburned carbon on fly ash. Such benefits of autocatalytic methods as provided herein may serve to increase overall boiler efficiency, while also enhancing the value of byproduct fly ash, possibly avoiding the generation of an otherwise solid waste.

Autocatalytic methods in accordance with the present invention also mail beneficially consume $NH_3$ breakthrough from a previous exhaust gas treatment using SNCR. In such embodiments, the autocatalytic methods may replace the use of SCR as a means for controlling $NH_3$ breakthrough from SNCR. Autocatalytic methods, however, may be preferably applied in place of SNCR in order to reduce NOx more selectively. The better selectivity of autocatalytic methods as provided herein may greatly decrease the consumption and cost of reductant(s), while depleting both CO and $NH_3$ in a substantially concurrent manner, and reducing NOx emissions to lower levels.

Autocatalytic methods in accordance with the present invention may reduce NOx emissions below most regulatory requirements, and the present invention typically supplants the need for expensive catalysts altogether. Autocatalytic activity for removing $NH_3$ and CO along with NOx in accordance with the present invention may be self-sustained and in a manner that does not deteriorate with use like solid catalysts. As a result, autocatalytic methods as provided herein may avoid the need to replace existing catalysts poisoned by exhaust contaminants.

If emissions regulations require additional NOx reductions, then autocatalytic methods as provided herein may serve to enhance SCR applications while minimizing the catalyst volume. In addition to reducing NOx before SCR, autocatalytic methods also may decrease contaminants such as hydrocarbons and soot which may foul catalytic surfaces. In embodiments utilizing such combination of treatments, autocatalytic methods may enable the use of more efficient or cost-effective catalyst beds due to both contaminant removal and the control of exhaust gas temperatures.

In a preferred combination of autocatalytic and catalytic reduction methods, the autothermal heating continuously decreases hydrocarbon and soot contaminants while controlling the exhaust gas temperature to the catalyst. Emissions of NOx are maintained at the required level using a separate injection of $NH_3$ ahead of the catalyst to minimize reductant(s) utilized with the autocatalytic method. In many such situations, the autocatalytic NOx reduction need not exceed about 80–90%, so reductant(s) are converted nearly stoichiometrically and CO emissions are depleted substantially in the shortest time possible.

Substantial depletion of both $NH_3$ and CO uniquely enables autocatalytic reduction of nonuniform NOx and CO distributions. Similar to catalytic methods, autocatalytic methods may remove excess $NH_3$ while reducing NOx to low levels. As a result, nonuniform distributions of NOx in the exhaust gas tend to only decrease the selectivity of NOx reduction by the autocatalytic methods. By reducing both NOx and $NH_3$ to uniformly low levels, autocatalytic methods may replace the need for mixing the exhaust gas, especially when such autocatalytic methods are combined with SCR to achieve ultra-low emissions levels.

Autocatalytic methods as provided herein are uniquely suited for combination with catalytic air heater elements. Such catalytic elements replace existing heat transfer surfaces in rotary regenerative air heaters, such as described in U.S. Pat. Nos. 4,602,673, 4,678,643, 4,719,094 and 4,867,953. Using autocatalytic methods to control temperature as well as uniform NOx levels ahead of the catalyst greatly enhances the capability for both NOx and $NH_3$ removal within the limited volume for the installation of catalytic elements in existing air heaters.

In heat exchange boiler embodiments, replacement of air heater elements also may enhance the recovery of heat released with autocatalytic methods. Increasing exhaust gas temperatures enhances heat recovery by all existing surfaces downstream from the heat release, but this enhancement does not generally recover all of the autothermal heat release. Complete recovery of the autothermal heat release usually requires the installation of some new heat transfer surfaces. Replacement air heater elements with improved surfaces may conveniently be utilized to complete the recovery of the autothermal heat release.

This replacement of air heater elements may uniquely complete the recovery of the autothermal heat release while also providing catalytic surfaces to achieve ultra-low levels of both NOx and $NH_3$. In certain embodiments, such modifications may even enable improvements to boiler efficiency by lowering stack gas temperatures. Boiler efficiency may be improved even further when autocatalytic methods are implemented in combination with combustion modifications to decrease the unburned carbon on fly ash.

In such various applications, autocatalytic methods as provided herein are implemented by controlling the final temperature of autothermal heating at a level in the range of about 1400–1550° F. This controlled condition preferably is achieved using one or mole injection nozzles for the introduction of hydrocarbon(s) and reductant(s). Such nozzles may inject the hydrocarbon(s) and reductant(s) separately or concurrently, as mixtures, solutions, emulsions, slurries or combined chemical structures, using combinations of solids, liquids, and gases.

Furthermore, the introduction of hydrocarbon(s) and reductant(s) may involve the use of pressurized gas to convey or atomize the injected material(s). The pressurized gas may consist of steam, air, exhaust gas or the gaseous or vaporous forms of the hydrocarbon(s) or reductant(s). When compressed air is used to convey or atomize any of the injected material(s), the compressed air may beneficially enrich the $O_2$ concentration in the exhaust gas.

In certain embodiments, one or more injection nozzles are arranged in various ways so long as the distribution of hydrocarbon(s) and reductant(s) in the exhaust gas is sufficiently uniform to avoid localized heating beyond the temperature range of about 1400–1550° F. The distribution and mixing of injected material(s) may include various uses of vanes or baffles to swirl the exhaust gas or to generate turbulent mixing eddies. Such methods or their combinations should disperse the injected hydrocarbon(s) in a substantially uniform manner before the appearance of a chemiluminescence.

Locating such baffles or swirl vanes either before or after the injection locations may enable the continued mixing of the exhaust gas throughout a portion, or even all, of the flowpath during autothermal heating. Any such modifications to the gas flowpath preferably extend over the entirety of its cross-section. The use of such methods for mixing the exhaust gas also may enable the introduction of hydrocarbon (s) and reductant(s) using a variety of convenient nozzle configurations such as wall injectors or injection grids.

In certain embodiments, the use of injection grids may avoid the need for modifying the gas flowpath. In such embodiments, a multiplicity of nozzles preferably are used to distribute hydrocarbon(s) and reductant(s) over the cross-section of the gas flowpath. Such injection grids may resemble the well known commercial practice of distributing prevaporized $NH_3$ ahead of solid catalysts in SCR methods. Alternatively, the injection grids may consist of liquid nozzles using either pressure or gas atomization.

When hydrocarbon(s) or reductant(s) are introduced as liquids, the preferred atomization depends on the degree of exhaust gas mixing. In certain embodiments, no atomization is needed if the exhaust gas is well mixed by turbulent flow conditions. For example, autocatalytic methods in accordance with the present invention may be implemented in ducts as large as three feet or more in diameter using only a single injector when the exhaust gas is swirled sufficiently to mix the vaporized hydrocarbon(s) and reductant(s). Atomized drops in the range of about 20–500 microns, however, are preferred in embodiments where the mixing depends primarily on dispersion.

Hydrocarbon(s) and reductant(s) are preferably introduced in their most concentrated form. Using concentrated mixtures or solutions tends to minimize heat losses due to the sensible and latent heats of carrier liquids or gases. The dilution of injected material(s), however, may enhance their dispersion in some cases. For example, aqueous solutions of urea may require dilution in order to supply a multiplicity of nozzles needed for adequate dispersion or to decrease the size of reductant particles remaining after water evaporation from atomized drops. In such embodiments, commercial aqueous solutions containing about 50% by weight urea are diluted below even a 35% concentration that is typically used to prevent crystallization in storage tanks and other distribution equipment.

The distribution of hydrocarbon(s) or reductant(s) to injectors must prevent degradation of the material(s) prior to injection. Such degradation can result in the plugging of distribution networks or nozzle orifices. While heating or vaporization of some material(s) may enhance their injection without degradation, other material(s) may require a means to prevent such heating or vaporization. In embodiments where the later may occur, the atomizing gas also may serve as a cooling medium or insulating boundary for preventing degradation before injection.

Chemical additives also may help to prevent scaling or plugging in distribution networks prior to the injection of hydrocarbon(s) or reductant(s). Such chemical additives may comprise any of the commercially available formulations for this purpose. The use of distilled or de-ionized water for aqueous solutions may prevent scaling in storage tanks, piping and other equipment or instrumentation used to pressurize, meter, transport, distribute and inject chemical reductant(s) such as $NH_3$ or urea. In addition, scaling and corrosion are minimized by selecting proper materials of construction throughout these systems, depending on the injected material(s).

What may be understood from the foregoing is as follows. In accordance with the present invention, a wide variety of methods for reducing NOx from industrial exhaust gases are provided, which may comprise autothermally heating the exhaust gas using one or more hydrocarbons in the presence of $NH_3$, HNCO or a combination thereof, wherein the autothermal heating is under conditions effective for selectively reducing the NOx autocatalytically. Such methods may consist of the steps of: controlling the initial temperature and composition of an exhaust gas in the ranges of about 900–1600° F. and about 2–18% $O_2$, respectively, effective for autoignition of hydrocarbon(s); controlling the introduction of hydrocarbon(s) to autoignite and release heat autothermally effective for self-sustaining autocatalytic reactions under fuel-lean conditions wherein the exhaust gas contains at least about 1% $O_2$ and is heated to a final temperature in the range of about 1400–1550° F.; introducing reductant(s) for NOx into the exhaust gas wherein $NH_3$, HNCO or a combination thereof are generated from the reductant(s); wherein NOx is reduced selectively, and the $NH_3$, HNCO and hydrocarbon(s), including byproduct CO are depleted substantially.

As will be appreciated from the above description, other methods in accordance with the present invention include the following. A method for autothermally heating exhaust gases using hydrocarbon(s) so that $NH_3$, HNCO or a combination thereof are effective for selectively reducing NOx autocatalytically. A method for autothermally heating exhaust gases to temperatures in the range of about 1400–1550° F. using hydrocarbon(s) to remove CO so that $NH_3$, HNCO or a combination thereof are concurrently effective for selectively reducing NOx autocatalytically. A method including the steps of: controlling the initial temperature and composition of an exhaust gas effective for autoignition of hydrocarbon(s); controlling the introduction of hydrocarbon(s) to autoignite and release heat autothermally effective for self-sustaining autocatalytic reactions under fuel-lean conditions wherein the exhaust gas contains at least about 1% $O_2$; introducing reductant(s) for NOx into the exhaust gas wherein $NH_3$, HNCO or a combination thereof are generated from the reductant(s); wherein NOx is reduced selectively, and the $NH_3$, HNCO and hydrocarbon(s), including byproduct CO are depleted substantially.

Other methods in accordance with the present invention include the following. A method for autothermally heating exhaust gases using hydrocarbon(s) so that $NH_3$, HNCO or a combination thereof are effective for selectively reducing oxides of nitrogen. A, method for selectively reducing oxides of nitrogen in an exhaust gas using $NH_3$, HNCO or a combination thereof while hydrocarbon(s) autoignite and heat the exhaust gas autothermally. A method for selectively reducing oxides of nitrogen in an exhaust gas using $NH_3$, HNCO or a combination thereof while hydrocarbon(s) autoignite and heat the exhaust gas autothermally, substantially depleting residual concentrations of unburned hydrocarbons, CO, HNCO and $NH_3$. A method for selectively reducing oxides of nitrogen in an exhaust gas using $NH_3$, HNCO or a combination thereof while hydrocarbons(s) autoignite and heat the exhaust gas autothermally to a temperature in the range of about 1400–1550° F. A method for selectively reducing oxides of nitrogen in an exhaust gas using $NH_3$, HNCO or a combination thereof while hydrocarbons(s) autoignite and heat the exhaust gas autothermally to a temperature in the range of about 1400–1550° F., substantially depleting residual concentrations of unburned hydrocarbons, CO, HNCO and $NH_3$. A method for autothermally heating exhaust gases using hydrocarbon(s) so that $NH_3$, HNCO or a combination thereof are effective for selectively reducing oxides of nitrogen while residual concentrations of unburned hydrocarbons, CO, HNCO and $NH_3$ are depleted substantially.

Still other methods in accordance with the present invention include the following. A method for autothermally heating exhaust gases to a temperature in the range of about 1400–1550° F. using hydrocarbon(s) so that $NH_3$, HNCO or a combination thereof are effective for selectively reducing oxides of nitrogen. A method for autothermally heating exhaust gases to a temperature in the range of about 1400–1550° F. using hydrocarbon(s) so that $NH_3$, HNCO or a combination thereof are effective for selectively reducing oxides of nitrogen while residual concentrations of unburned hydrocarbons, CO, HNCO and $NH_3$ are depleted substantially. A method for autoignition of hydrocarbon(s) in exhaust gases so that $NH_3$, HNCO or a combination thereof are effective for selectively reducing oxides of nitrogen while the exhaust gas is heated autothermally. A method for autoignition of hydrocarbon(s) in exhaust gases so that $NH_3$, HNCO or a combination thereof are effective for selectively reducing oxides of nitrogen while the exhaust gas is heated autothermally to substantially deplete residual concentrations of unburned hydrocarbons, CO, HNCO and $NH_3$. A method for autoignition of hydrocarbon(s) in exhaust gases so that $NH_3$, HNCO or a combination thereof are effective for selectively reducing oxides of nitrogen while the exhaust gas is heated autothermally to a temperature in the range of about 1400–1550° F.

Yet other methods in accordance with the present invention include the following. A method for autoignition of hydrocarbon(s) in exhaust gases so that $NH_3$, HNCO or a combination thereof are effective for selectively reducing oxides of nitrogen while the exhaust gas is heated autothermally to a temperature in the range of about 1400–1550° F., substantially depleting residual concentrations of unburned hydrocarbons, CO, HNCO and $NH_3$. A method of generating $NH_3$, HNCO or a combination thereof from chemical reductant(s) so that oxides of nitrogen in an exhaust gas are reduced selectively while the exhaust gas is heated autothermally by hydrocarbon(s). A method of generating $NH_3$, HNCO or a combination thereof from chemical reductant(s) so that oxides of nitrogen in an exhaust gas are reduced selectively while the exhaust gas is heated autothermally by hydrocarbon(s) to substantially deplete residual concentrations of unburned hydrocarbons, CO, HNCO and $NH_3$. A method of generating $NH_3$, HNCO or a combination thereof from chemical reductant(s) so that oxides of nitrogen in an exhaust gas are reduced selectively while the exhaust gas is heated autothermally by hydrocarbon(s) to a temperature in the range of about 1400–1550° F. A method of generating $NH_3$, HNCO or a combination thereof from chemical reductant(s) so that oxides of nitrogen in an exhaust gas are reduced selectively while the exhaust gas is heated autothermally by hydrocarbon(s) to a temperature in the range of about 1400–1550° F., substantially depleting residual concentrations of unburned hydrocarbons, CO, HNCO and $NH_3$.

Still other methods in accordance with the present invention include the following. A method for concurrently removing oxides of nitrogen and carbon monoxide from an exhaust gas using $NH_3$, HNCO or a combination thereof while hydrocarbon(s) autoignite and heat the exhaust gas autothermally. A method for concurrently removing oxides of nitrogen and carbon monoxide from an exhaust gas using $NH_3$, HNCO or a combination thereof while hydrocarbon(s) autoignite and heat the exhaust gas autothermally, substantially depleting residual concentrations of unburned hydrocarbons, HNCO and $NH_3$. A method for concurrently removing oxides of nitrogen and carbon monoxide from an exhaust gas using $NH_3$, HNCO or a combination thereof while hydrocarbons(s) autoignite and heat the exhaust gas autothermally to a temperature in the range of about 1400–1550° F. A method for concurrently removing oxides of nitrogen and carbon monoxide from an exhaust gas using $NH_3$, HNCO or a combination thereof while hydrocarbons (s) autoignite and heat the exhaust gas autothermally to a temperature in the range of about 1400–1550° F., substantially depleting residual concentrations of unburned hydrocarbons, HNCO and $NH_3$. A method for treating an exhaust gas to remove oxides of nitrogen along with carbon monoxide and other combustible contaminants using $NH_3$, HNCO or a combination thereof while hydrocarbon(s) autoignite and heat the exhaust gas autothermally. A method for treating an exhaust gas to remove oxides of nitrogen along with carbon monoxide and other combustible contaminants using $NH_3$, HNCO or a combination thereof while hydrocarbon(s) autoignite and heat the exhaust gas autothermally, substantially depleting residual concentrations of HNCO and $NH_3$. A method for treating an exhaust gas to remove oxides of nitrogen along with carbon monoxide and other combustible contaminants using $NH_3$, HNCO or a combination thereof while hydrocarbons(s) autoignite and heat the exhaust gas autothermally to a temperature in the range of about 1400–1550° F.

Other methods in accordance with the present invention include the following. A method for treating an exhaust gas to remove oxides of nitrogen along with carbon monoxide and other combustible contaminants using $NH_3$, HNCO or a combination thereof while hydrocarbons(s) autoignite and heat the exhaust gas autothermally to a temperature in the range of about 1400–1550° F., substantially depleting residual concentrations of HNCO and $NH_3$. A method for treating an exhaust gas to remove unburned hydrocarbons, CO and other combustible contaminants using hydrocarbon (s) to autoignite and heat the exhaust gas autothermally so that $NH_3$, HNCO or a combination thereof are also effective for selectively reducing oxides of nitrogen in the exhaust gas. A method for treating an exhaust gas to remove unburned hydrocarbons, CO and other combustible contaminants while concurrently depleting residual HNCO and $NH_3$ using hydrocarbon(s) to autoignite and heat the exhaust gas autothermally so that $NH_3$, HNCO or a combination thereof are also effective for selectively reducing oxides of nitrogen in the exhaust gas. A method for treating an exhaust gas to remove unburned hydrocarbons, CO and other combustible contaminants using hydrocarbon(s) to autoignite and heat the exhaust gas autothermally to a temperature in the range of about 1400–1550° F. so that $NH_3$, HNCO or a combination thereof are also effective for selectively reducing oxides of nitrogen in the exhaust gas. A method for treating an exhaust gas to remove unburned hydrocarbons, CO and other combustible contaminants while concurrently depleting residual HNCO and $NH_3$ using hydrocarbon(s) to autoignite and heat the exhaust gas autothermally to a temperature in the range of about 1400–1550° F. so that $NH_3$, HNCO or a combination thereof are also effective for selectively reducing oxides of nitrogen in the exhaust gas. A method including the steps of: introducing reductant(s) for oxides of nitrogen into the exhaust gas so that the reductant(s) generate $NH_3$, HNCO or a combination thereof; introducing hydrocarbon(s) into an exhaust gas containing about 2–18% oxygen at a temperature in the range of about 900–1600° F. so that the hydrocarbon(s) autoignite in the exhaust gas; wherein the oxides of nitrogen are reduced selectively while the exhaust gas is heated autothermally by self-sustained autocatalytic reactions.

As also may be understood from the foregoing, in accordance with embodiments of the present invention: NOx in the exhaust gas may be reduced nearly stoichiometrically by as much as 80–90%; NOx in the exhaust gas may be selectively reduced by as much as about 99%; NOx in the exhaust gas may be reduced to a level in the range of about 10–200 ppm; and $NH_3$ and HNCO together may be in the range of about 0.5–2.0 or 0.5–4.0 molar ratio with respect to the NOx in the exhaust gas. Higher molar ratios of $NH_3$ and HNCO together up to about 4.0 (e.g., from 0.5 to 4.0, 0.75 to 4.0, from 0.75 to 3.5, about 3.0, about 3.5, about 4.0, etc.) with respect to NOx may generally increase NOx reduction without appreciably increasing $NH_3$ breakthrough using autocatalytic methods in accordance with the present invention, but the ccst-effectiveness of such higher molar ratio embodiments diminishes when $NH_3$ and HNCO, etc. are used at levels in excess of twice the stoichiometric ratio with respect to baseline NOx levels.

Additionally: the selective NOx reduction and the depletion of residual $NH_3$ and HNCO may contribute to the exhaust gas heating; the oxidation of combustible contaminants in the exhaust gas may contribute to exhaust gas heating; the exhaust gas temperature may be initially in the range of about 900–1600° F. and the exhaust gas initially may contain $O_2$ in the range of about 2–18%; the autothermal heat release may be initiated by autoignition of hydrocarbon(s) in the exhaust gas; the exhaust gas may be heated substantially uniformly by the autoignition of hydrocarbon(s) and the self-sustained autothermal heat release from autocatalytic reactions; the autocatalytic reactions may be self-sustained in the autothermally heated exhaust gas even when a portion of the heat released is recovered by heat transfer surfaces; the heat release may be equivalent to a uniform adiabatic increase of about 50–500° F. in the exhaust gas temperature; the exhaust gas may be heated within about 0.02–1.5 seconds to a final temperature; the exhaust gas may be heated to a final temperature in the range of about 1400–1550° F.; the exhaust gas may contain at least about 1% $O_2$ at a final temperature in the range of about 1400–1550° F.; residual concentrations of hydrocarbons, CO, $NH_3$ and HNCO may be depleted substantially at a final temperature in the range of about 1400–1550° F.; the CO may be oxidized below a residual concentration of about 2000 ppm; the CO may be oxidized below a residual conzentration of about 500 ppm; the residual concentration of CO may be maintained at a level below about 500 ppm by controlling the final exhaust gas temperature to be in the range of about 1400–1550° F.; and the residual concentration of $NH_3$ may be maintained at a level below about 20 ppm by controlling the final exhaust gas temperature in the range of about 1400–1550° F., or by controlling and/or monitoring the level of CO.

Additionally: the residual concentrations of CO and $NH_3$ may be depleted together autocatalytically in the exhaust gas at a final temperature in the range of about 1400–1550° F.; the final temperature may be controlled in the range of about 1400–1550° F. to maintain the residual CO concentration below about 50 ppm while depleting the residual $NH_3$ below about 2 ppm; the hydrocarbon(s) may consist of material(s) selected from the group consisting of hydrocarbon mixtures such as natural gas, liquefied petroleum gas, alcohols, gasoline, diesel fuel, aviation turbine fuel, various oxygenated hydrocarbons, hydrocarbon amines, or any fraction of such mixtures, including purified components such as carbon monoxide, methane, propane, methanol, and ethanol, either as liquids or vapors; the hydrocarbons(s) may consist of the same material(s) as the liquid, gaseous, or vaporous fuel used to produce or otherwise heat the exhaust gas initially in the temperature range of about 900–1600° F.; the hydrocarbon(s) may be introduced into the exhaust gas substantially throughout a cross-section or around a perimeter of the exhaust gas flowpath using one or more nozzles, including a multiplicity thereof; the hydrocarbon(s) may be introduced as liquid drops with diameters in the range of about 20–500 microns; the hydrocarbon(s) may be introduced in the exhaust gas using a carrier or atomizing gas such as steam, compressed air, pressurized exhaust gas, gaseous or vaporous hydrocarbon(s) or any gaseous or vaporous $NH_3$ compositions; the hydrocarbon(s) and any carrier or atomizing gas may be distributed to an arrangement of one or more nozzles, including a multiplicity thereof; and the hydrocarbon(s) and any carrier or atomizing gas may be distributed in ways that prevent carbon formation or enhance the uniformity of autoignition and autothermal heating.

Additionally: the hydrocarbon(s) and any carrier or atomizing gas may be pressurized and/or metered; a final temperature may be measured at one or more locations throughout the cross-section of the exhaust gas flowpath and the amount of introduced hydrocarbon(s) may be controlled to maintain the measured temperature(s) at a level in the range of about 1400–1550° F.; the final CO concentration may be measured at one or more locations throughout the cross-section of the exhaust gas flowpath downstream from the temperature measurement(s); the final CO measurement(s) may be used to verify a level of CO depletion corresponding to the final temperature(s) for controlling the introduction of hydrocarbon(s); $NH_3$, HNCO or a combination thereof may be introduced into the exhaust gas; $NH_3$, HNCO or a combination thereof may be generated by vaporization, decomposition or catalytic conversion of reductant(s) which may consist of material(s) selected from the group consisting of $NH_3$, HNCO, cyanuric acid or a tautomer of cyanuric acid, urea, decomposition products of urea, compounds which decompose to produce $NH_3$ as a byproduct, ammonium salts of organic acids, hydrocarbon amines, or combinations of the foregoing, whether pure compounds or mixtures, as solids, liquid melts, emulsions, slurries, or solutions in water, alcohols, hydrocarbons, or oxygenated hydrocarbon solvents; the $NH_3$, HNCO or a combination thereof may be generated prior to the introduction of the hydrocarbon(s); and the $NH_3$, HNCO or a combination thereof may be generated after the introduction of hydrocarbon(s); the $NH_3$, HNCO or a combination thereof may be generated concurrently with the hydrocarbon(s).

Additionally: reductant(s) may be injected directly to vaporize or decompose in the exhaust gas; the reductant(s) may be injected prior to the introduction of hydrocarbon(s); the reductant(s) may be injected after the introduction of hydrocarbon(s); the reductant(s) may be injected concurrently with the introduced hydrocarbon(s) as mixtures, solutions, emulsions, slurries, atomizing gases, atomized liquids or combined chemical structures; the reductant(s) may be injected substantially throughout a cross-section or around a perimeter of the exhaust gas flowpath using one or more nozzles, including a multiplicity thereof; the reductant(s) may be injected using a carrier or atomizing gas such as steam, compressed air, pressurized exhaust gas, gaseous or vaporous hydrocarbon(s) or any gaseous or vaporous $NH_3$ compositions; the reductant(s) are atomized to form liquid drops with diameters in the range of about 20–500 microns; the reductant(s) and any carrier or atomizing gas may be distributed to an arrangement of one or more nozzles, including a multiplicity thereof; the reductant(s) and any carrier or atomizing gas may be distributed in ways that prevent the accumulation of solid deposits and enhance the consistent introduction of $NH_3$, HNCO or a combination thereof in the exhaust gas; the reductant(s) may consist of a concentrated aqueous solution consisting of $NH_3$, urea or combinations thereof in water containing dissolved nitrogen in the range of about 15–30% by weight; a concentrated aqueous solution of reductant(s) may be diluted with water; and the reductant(s), dilution water and any carrier or atomizing gas may be pressurized and/or metered.

Additionally: baseline NOx levels in the exhaust gas may be measured with respect to an operating condition of combustion equipment that produces the exhaust gas and the amount of reductant(s) injected to maintain a predetermined level of NOx reduction or a predetermined final NOx level in the exhaust gas may be controlled throughout the operating range of the combustion equipment; an operating condition of the combustion equipment may be monitored to provide a basis for estimating the baseline NOx emissions throughout the operating range of the combustion equipment, either continuously or on a periodic basis; the amount of injected reductant(s) may be controlled to generate $NH_3$ and HNCO together at a level in the range of about 0.5–2.0 molar ratio with respect to the baseline NOx depending on a measurement of the operating condition for the combustion equipment; the final NOx level may be measured at one or more locations throughout the cross-section of the exhaust gas flowpath downstream from the autothermal heating and any temperature measurement(s) may be used to control the introduction of hydrocarbon(s); the final NOx level(s) may be used to verify the effectiveness of selective NOx reduction corresponding to an amount of introduced $NH_3$ and HNCO or an amount of reductant(s) injected to generate $NH_3$, HNCO or a combination thereof; the amount of introduced $NH_3$ and HNCO or the amount of reductant(s) injected may be controlled to maintain a predetermined final NOx level in the exhaust gas; and the amount of introduced $NH_3$ and HNCO together or the amount of reductant(s) injected may be increased or decreased depending on the need to lower or raise, respectively, the measured final NOx level with respect to a desired final level of NOx in the exhaust gas.

Additionally: the dilution water and any carrier or atomizing gas may be treated to prevent the formation of deposits or scale in surge tanks, piping, and other equipment or instrumentation used to pressurize, meter, transport, distribute, and inject the dilition water, carrier gas, or atomizing gas; concentrated aqueous solutions consisting of $NH_3$, urea, or combinations thereof may be formulated and/or prepared in water containing dissolved nitrogen in the range of about 15–30% by weight; the concentrated aqueous solution may be prepared using distilled or de-ionized water to prevent the formation of deposits or scale in storage tanks, piping and other equipment or instrumentation used to pressurize, meter, transport, distribute, and inject the dissolved reductant(s) as concentrated or diluted solutions in water; the concentrated aqueous solution may contain chemical additives to prevent the formation of deposits or scale in storage tanks, piping, and other equipment or instrumentation used to pressurize, meter, transport, distribute and inject the dissolved reductant(s) as concentrated or diluted solutions in water.

Additionally: the exhaust gas may be preheated or precooled to a temperature in the range of about 900–1600° F. before the introduction of hydrocarbon(s); the exhaust gas may be preheated or precooled to a temperature in the range of about 1050–1600° F. so that the exhaust gas is heated autothermally in about 0.02–1.0 seconds to a final temperature in the range of about 1400–1550° F. by a heat release equivalent to an adiabatic increase of about 50–350° F. effective for enhancing the selectivity of autocatalytic NOx reduction; the exhaust gas may be preheated or precooled to a temperature in the range of about 1200–1600° F. so that the exhaust gas is heated autothermally in about 0.02–0.5 seconds to a final temperature in the range of about 1400–1550° F. by a heat release equivalent to an adiabatic increase of about 50–200° F. effective for enhancing the selectivity of autocatalytic NOx reduction; the exhaust gas temperature may be controlled at a level in the range of about 900–1600° F. before the introduction of hydrocarbon(s); and heat may be recovered from the autothermally heated exhaust gas using heat transfer surfaces to preheat the exhaust gas in the temperature range of about 900–1350° F.

Additionally: the temperature of the autothermally heated exhaust gas may be controlled at a level in the range of about 1400–1550° F. in order to maintain the preheated exhaust gas temperature in the range of about 900–1350° F. using a heat exchanger; a supplemental fuel may be combusted to preheat the exhaust gas in the temperature range of about 900–350° F.; a supplemental fuel may be combusted directly in the exhaust gas; the exhaust gas may be preheated by mixing with the products from combustion of supplemental fuel ard air; a supplemental fuel may be combusted directly in the exhaust gas after a portion of the exhaust gas is preheated by mixing with the products from combustion of supplemental fuel and air; the supplemental fuel may consist of the same hydrocarbon(s) which autoignite and maintain the autocatalytic heat release in the exhaust gas; the supplemental fuel may consist of the same material(s) used to produce the exhaust gas; and the exhaust gas may be enriched to contain in the range of about 2–5% $O_2$ using excess air for the combustion of supplemental fuel.

Additionally: the exhaust gas flowpath may be modified to mix the injected materials(s) as well as the exhaust gas composition; the exhaust gas flowpath may be modified before the introduction of hydrocarbon(s); the exhaust gas flowpath may be modified after the introduction of hydrocarbon(s); the exhaust gas flowpath may be modified both before and after the introduction of hydrocarbon(s); the mixing effects may extend substantially throughout the cross-section of the exhaust gas flowpath and may continue to mix the exhaust g;as composition for a portion, or even all, of the autothermal heating; vanes may be used to swirl the gas flowpath, either as a single swirl flow or as a multiplicity of mixing swirl flows; baffles may be used to generate a multiplicity of turbulent mixing eddies; and the introduced hydrocarbon(s) to may be mixed substantially uniformly before the appearance of a visible chemilaminescence.

Additionally: heat may be recovered from the autothermally heated exhaust gas using heat transfer surfaces between the exhaust gas and the heat recovery fluid; heat may be recovered from the exhaust gas to heat another fluid such as steam, water, combustion air or a petrochemical composition; a petrochemical composition may be cracked; steam may be generated; and the steam may be coupled to a turbine and operate machinery or generate electricity.

Additionally: the production of the exhaust gas containing NOx may be modified to maintain a temperature in the range of about 900–1600° F. and to contain in the range of about 2–18% $O_2$; the production of the exhaust gas may be modified by staging the primary combustion using secondary air or over-fire air to decrease the formation of NOx; the fuel consumed to produce the exhaust gas may be reduced by an amount of heat release less than or equal to the heat released by autocatalytic reactions in the exhaust gas; $O_2$ enrichment of the primary combustion may decrease the formation of combustible contaminants in the exhaust gas, including gaseous organics, soot, and unburned carbonaceous materials or particulate matter; and the $O_2$ enrichment of coal combustion may decrease unburned carbon on fly ash.

Additionally: a fuel may be combusted in a heat exchange boiler and the exhaust gas may be cooled before the introduction of hydrocarbon(s) which autoignite and maintain autocatalytic heat release in the exhaust gas; a petrochemical composition may be cracked; steam may be generated; the steam may be coupled to a turbine and operate machinery or generate electricity; a fuel may be combusted in an internal combustion engine; the internal combustion engine may be coupled to an electric generator, and electricity may be generated; the internal combustion engine may be coupled to a pump or compressor, and pressure and/or fluid flow may be generated using the pump or compressor; the internal combustion engine may be coupled to machinery, and the machinery may be operated so as to produce mineral resources; the internal combustion engine may be coupled to power mobile equipment, and personnel, materials, products or minerals may be transported and/or processed; and waste may be combusted in a waste to heat incinerator, and combustible waste may be disposed of.

Additionally: $NH_3$ breakthrough may be generated from a previous noncatalytic process for selectively reducing NOx, and NOx may be noncatalytically reduced at temperatures above 1600° F. prior to the autothermal exhaust gas heating and autocatalytic NOx reduction; a portion of the remaining NOx may be catalytically reduced using a solid catalytic surface and additional generation of $NH_3$, HNCO or combinations thereof after the autothermal exhaust gas heating; the exhaust gas may be heated autothermally to control the temperature for the subsequent catalytic NOx reduction using a solid catalytic surface; the first stage of gas-phase autocatalytic NOx reduction may lower the inlet NOx level to the solid catalytic surface; the first stage of autothermal heating may decrease exhaust gas contaminants such as hydrocarbons, soot, CO and particulate matter; and the solid catalytic surface may serve the dual purpose of decreasing the final NOx level and recovering a portion of the autothermal heat release.

From the foregoing, it will be understood and appreciated by those skilled in the art that the embodiments of the present invention may be utilized in a wide variety of applications and in modified configurations and the like.

Although various preferred embodiments of the present invention have br en disclosed for illustrative purposes, those skilled in the art will appreciate that various modifications, additions and/or substitutions are possible without departing from the scope and spirit of the present invention as disclosed in the claims.

What is claimed is:

1. A method for reducing pollutants including NOx in an exhaust gas, comprising the steps of:

generating the exhaust gas and controlling the initial temperature and composition of an exhaust gas in the ranges of about 900–1600° F. and about 2–18% $O_2$, respectively effective for autoignition of hydrocarbons;

controlling the introduction of hydrocarbons to autoignite and release heat autothermally effective for self-sustaining autocatalytic reactions under fuel-lean conditions wherein the exhaust gas contains at least 1% $O_2$ and is heated to a final temperature in the range of about 1400–1550° F.; and introducing one or more reductants for NOx into the exhaust gas wherein $NH_3$, HNCO or a combination thereof are generated from the reductant(s);

wherein the autothenmal heating results in autocatalytic conditions effective for reducing the NOx and substantially depleting the $NH_3$, HNCO and hydrocarbons and any by-product CO.

2. The method of claim 1, wherein the NOx in the exhaust gas is reduced nearly stoichiometrically with respect to the reductants by as much as 80–90%.

3. The method of claim 1, wherein the NOx in the exhaust gas is selectively reduced by at least about 99%.

4. The method of claim 1, wherein the NOx in the exhaust gas is reduced to a level in the range of about 10–200 ppm.

5. The method of claim 1, wherein $NH_3$ and HNCO together are in the range of about 0.5–2.0 molar ratio with respect to the NOx in the exhaust gas.

6. The method of claim 1, wherein the autocatalytic reactions are self-sustained in the autothermally heated exhaust gas even when a portion of the heat released is recovered by heat transfer surfaces.

7. The method of claim 1, wherein the heat release is equivalent to a uniform adiabatic increase of about 50–500° F. in the exhaust gas temperature.

8. The method of claim 1, wherein the autothermal heating and autocatalytic NOx reduction are completed within about 0.02–1.5 seconds.

9. The method of claim 1, wherein the CO is oxidized below a residual concentration of about 2000 ppm.

10. The method of claim 1, wherein the CO is oxidized below a residual concentration of about 500 ppm.

11. The method of claim 1, wherein the residual concentration of $NH_3$ is maintained at a level below about 20 ppm.

12. The method of claim 1, wherein the residual CO concentration is depleted below about 50 ppm and the residual $NH_3$ is depleted below about 2 ppm.

13. The method of claim 1, wherein the hydrocarbon(s) are at least one member selected from the group consisting of natural gas, liquefied petroleum gas, alcohols, gasoline, diesel fuel, aviation turbine fuel, oxygenated hydrocarbons, hydrocarbon amines, methane, propane, methanol and ethanol.

14. The method of claim 1, wherein the hydrocarbon(s) are introduced throughout a cross-section or around a perimeter of the exhaust gas flowpath using one or more nozzles.

15. The method of claim 1, wherein the hydrocarbon(s) are introduced as liquid drops with diameters in the range of about 20–500 microns.

16. The method of claim 1, wherein the hydrocarbon(s) are introduced in the exhaust gas using a carrier gas selected from the group consisting of steam, compressed air, pressurized exhaust gas, or ammonia.

17. The method of claim 1, further comprising the steps of measuring a final temperature at one or more locations throughout the cross-section of the exhaust gas flowpath and controlling the amount of introduced hydrocarbon(s) to maintain the measured temperature(s) at a level in the range of about 1400–1550° F.

18. The method of claim 17, further comprising the step of measuring a final CO concentration at one or more locations throughout the cross-section of the exhaust gas flowpath downstream from the temperature measurement(s).

19. The method of claim 18, further comprising the step of using the final CO measurement(s) to control the introduction of hydrocarbon(s).

20. The method of claim 1, further comprising the step of generating $NH_3$, HNCO or a combination thereof by vaporization, decomposition, or catalytic conversion of at least one reductant(s) selected from the group consisting of $NH_3$, HNCO, cyanuric acid, a tautomer of cyanuric acid, urea, ammonium salts of organic acids, and hydrocarbon amines.

21. The method of claim 1, wherein the $NH_3$, HNCO or a combination thereof are generated prior to the introduction of hydrocarbon(s).

22. The method of claim 1, wherein the $NH_3$, HNCO or a combination thereof are generated after the introduction of hydrocarbon(s).

23. The method of claim 1, wherein the $NH_3$, HNCO or a combination thereof are generated concurrently with the hydrocarbon(s).

24. The method of claim 1, further comprising the step of injecting reductant(s) directly into the exhaust gas to vaporize or decompose the reductant(s).

25. The method of claim 24, wherein the reductant(s) are injected prior to the introduction of hydrocarbon(s).

26. The method of claim 24, wherein the reductant(s) are injected after the introduction of hydrocarbon(s).

27. The method of claim 24, wherein the reductant(s) are injected concurrently with the introduced hydrocarbon(s), wherein the reductants are infected as mixtures, solutions, emulsions, slurries, or atomized gases.

28. The method of claim 24, wherein the reductant(s) comprise a concentrated aqueous solution containing $NH_3$, urea or combinations thereof wherein the aqueous solution contains dissolved nitrogen in the range of about 15–30% by weight.

29. The method of claim 24, further comprising the steps of measuring baseline NOx levels in the exhaust gas with respect to an operating condition of combustion equipment that produces the exhaust gas and controlling the amount of reductant(s) injected to maintain a level of NOx reduction or a final NOx level in the exhaust gas throughout the operating range of the combustion equipment.

30. The method of claim 29, further comprising the step of monitoring an operating condition of the combustion equipment to provide a basis for estimating the baseline NOx emissions throughout the operating range of the combustion equipment, either continuously or periodically.

31. The method of claim 30, wherein the amount of injected reductant(s) is controlled to generate $NH_3$ and HNCO together at a level in the range of about 0.5–2.0 molar ratio with respect to the baseline NOx.

32. The method of claim 24, further comprising the step of measuring a final NOx level at one or more locations throughout the cross-section of the exhaust as flowpath downstream from the autothermal heating and using the temperature measurement(s) to control the introduction of hydrocarbon(s).

33. The method of claim 32, further comprising the step of using the final NOx level(s) to verify the effectiveness of selective NOx reduction corresponding to an amount of introduced $NH_3$ and HNCO or an amount of reductant(s) injected to generate $NH_3$, HNCO or a combination thereof.

34. The method of claim 33, further comprising the step of controlling the amount of introduced $NH_3$, HNCO or the amount of reductant(s) injected to maintain a final NOx level in the exhaust gas.

35. The method of claim 1, further comprising the step of adjusting the temperature of the exhaust gas to a temperature in the range of about 900–1600° F. before the introduction of hydrocarbon(s).

36. The method of claim 35, wherein the temperature of the exhaust gas is adjusted to a temperature in the range of about 1050–1600° F. so that the exhaust gas is healed autothermally in 0.02–1.0 seconds to a final temperature in the range of about 1400–1550° F. by a heat release equivalent to an adiabatic increase of about 50–350° F. effective for enhancing the selectivity of autocatatytic NOx reduction.

37. The method of claim 35, wherein the temperature of the exhaust gas is adjusted to a temperature in the range of about 1200–1600° F. so that the exhaust gas is heated autothermally in 0.02–0.5 seconds to a final temperature in the range of about 1400–1550° F. by a heat release equivalent to an adiabatic increase of about 50–200° F. effective for enhancing the selectivity of autocatalytic NOx reduction.

38. The method of claim 1, further comprising the step of combusting a fuel to preheat the exhaust gas to the temperature range of about 900–1350° F.

39. The method of claim 38, wherein the fuel is combusted directly in the exhaust gas.

40. The method of claim 1, wherein the introduced hydrocarbon(s) are mixed substantially uniformly and the autothermal heating results in an appearance of a visible chemiluminescence.

41. The method of claim 1, further comprising the step of recovering heat from the autothermally heated exhaust gas using heat transfer surfaces between the exhaust gas and the heat recovery fluid.

42. The method of claim 1, wherein the exhaust gas is generated by a previous noncatalytic method for selectively reducing NOx.

43. The method of claim 1, further comprising the step of catalytically reducing a portion of any remaining NOx after the autothermal exhaust gas heating and autocatalytic NOx reduction.

44. The method of claim 43, wherein the exhaust gas is heated autothermally to control the temperature for the catalytic NOx reduction.

45. The method of claim 43, wherein the autothermal heating decreases exhaust gas contaminants comprising hydrocarbons, soot, CO or particulate matter.

* * * * *